US012162242B2

(12) United States Patent
Fukuchi et al.

(10) Patent No.: US 12,162,242 B2
(45) Date of Patent: Dec. 10, 2024

(54) MEDIUM PROCESSING APPARATUS AND IMAGE FORMING SYSTEM INCORPORATING SAME

(71) Applicants: Kensuke Fukuchi, Kanagawa (JP); Kei Sasaki, Kanagawa (JP); Kazuki Seto, Kanagawa (JP)

(72) Inventors: Kensuke Fukuchi, Kanagawa (JP); Kei Sasaki, Kanagawa (JP); Kazuki Seto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 162 days.

(21) Appl. No.: 18/157,142

(22) Filed: Jan. 20, 2023

(65) Prior Publication Data

US 2023/0234322 A1 Jul. 27, 2023

(30) Foreign Application Priority Data

Jan. 27, 2022 (JP) ................................ 2022-011157
Nov. 28, 2022 (JP) ................................ 2022-189481

(51) Int. Cl.
*B31F 1/36* (2006.01)
*B41J 11/58* (2006.01)

(52) U.S. Cl.
CPC ................ *B31F 1/36* (2013.01); *B41J 11/58* (2013.01)

(58) Field of Classification Search
CPC .... B31F 1/36; B31F 5/02; B41J 11/58; B42B 4/00; B42B 5/00; B42C 1/12
See application file for complete search history.

(56) References Cited

U.S. PATENT DOCUMENTS

| | | | |
|---|---|---|---|
| 2014/0219747 A1 | 8/2014 | Takahashi et al. | |
| 2020/0307945 A1 | 10/2020 | Mori et al. | |
| 2021/0316558 A1* | 10/2021 | Hirayama ............ | B41J 11/0024 |
| 2022/0334525 A1 | 10/2022 | Sasaki et al. | |

FOREIGN PATENT DOCUMENTS

| | | |
|---|---|---|
| JP | 2014-148398 | 8/2014 |
| JP | 2015-101009 | 6/2015 |

* cited by examiner

*Primary Examiner* — Lisa Solomon
(74) *Attorney, Agent, or Firm* — IPUSA, PLLC

(57) ABSTRACT

A medium processing apparatus includes a conveyor, a liquid applier, a crimper, a movement assembly, and circuitry. The crimper presses and deforms at least a portion of a plurality of media including a medium to which liquid is applied by the applier, to bind the media. The circuitry causes the assembly to move the applier from a standby position to a position at which the applier faces a liquid application position on the medium before the medium is conveyed to a position at which the liquid is applied; causes the applier to apply the liquid when the medium is conveyed to the position at which the applier faces the liquid application position; causes the assembly to not move the applier to the standby position until application of the liquid to the media ends; and causes the assembly to move the applier to the standby position after the application ends.

14 Claims, 24 Drawing Sheets

CONVEYANCE DIRECTION
MAIN SCANNING DIRECTION
22
25
31
32
49
HP
B1
B2
P1
P2

22
25
31
32
49
HP
B1
B2
P1
P2
P3
P4
CONVEYANCE DIRECTION
MAIN SCANNING DIRECTION

MEDIUM PROCESSING APPARATUS AND IMAGE FORMING SYSTEM INCORPORATING SAME

CROSS-REFERENCE TO RELATED APPLICATIONS

This patent application is based on and claims priority pursuant to 35 U.S.C. § 119(a) to Japanese Patent Application Nos. 2022-011157, filed on Jan. 27, 2022, and 2022-189481, filed on Nov. 28, 2022, in the Japan Patent Office, the entire disclosure of each of which is hereby incorporated by reference herein.

BACKGROUND

Technical Field

Embodiments of the present disclosure relate to a medium processing apparatus and an image forming system incorporating the medium processing apparatus.

Related Art

Medium processing apparatuses are known in the related art that bind, into a bundle, sheet-like media on which images are formed by image forming apparatuses. Since sheets of paper are widely known as an example of sheet-shaped media, a "sheet bundle" that is a stack of sheets of paper is used as an example of a bundle of sheet-shaped media in the following description. Some medium processing apparatuses include a crimper that can perform so-called "crimp binding" without metal binding needles (i.e., staples) from a viewpoint of resource saving and reduction in environmental load. Specifically, the crimper sandwiches a sheet bundle with serrate binding teeth to press and deform the sheet bundle.

An increased number of sheets of the sheet bundle hamper the binding teeth in biting into the sheet bundle and may cause some sheets to peel off from the bound sheets. Thus, the crimp binding has some difficulties in keeping the sheet bundle bound as appropriate. To increase the binding strength, some medium processing apparatuses that execute the crimp binding include a hydration unit that applies water in advance to a position on a sheet where the binding teeth contact the sheet, to allow the binding teeth to easily bite into a sheet bundle. In the following description, the position where the binding teeth contact a sheet may be referred to as a "binding position."

SUMMARY

According to an embodiment of the present disclosure, a medium processing apparatus includes a conveyor, a liquid applier, a crimper, a movement assembly, and circuitry. The conveyor conveys a medium. The liquid applier applies liquid to a liquid application position on the medium. The crimper presses and deforms at least a portion of a plurality of media including the medium to which the liquid is applied by the liquid applier, to bind the plurality of media, the portion of the plurality of media being the liquid application position to which the liquid is applied by the liquid applier. The movement assembly moves the liquid applier in a width direction of the medium. The circuitry controls the conveyor, the liquid applier, the crimper, and the movement assembly. The liquid applier is movable between a standby position at which the liquid applier stands by before the liquid applier starts moving in the width direction of the medium and a position at which the liquid applier faces the liquid application position on the medium. The circuitry causes the movement assembly to move the liquid applier from the standby position to the position at which the liquid applier faces the liquid application position before the medium is conveyed to a position at which the liquid is applied by the liquid applier; causes the liquid applier to apply the liquid to the medium when the medium is conveyed to the position at which the liquid applier faces the liquid application position on the medium; causes the movement assembly to not move the liquid applier to the standby position until application of the liquid to the plurality of media ends; and causes the movement assembly to move the liquid applier to the standby position after the application of the liquid to the plurality of media ends.

According to another embodiment of the present disclosure, an image forming system includes an image forming apparatus to form an image on the plurality of media and the medium processing apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
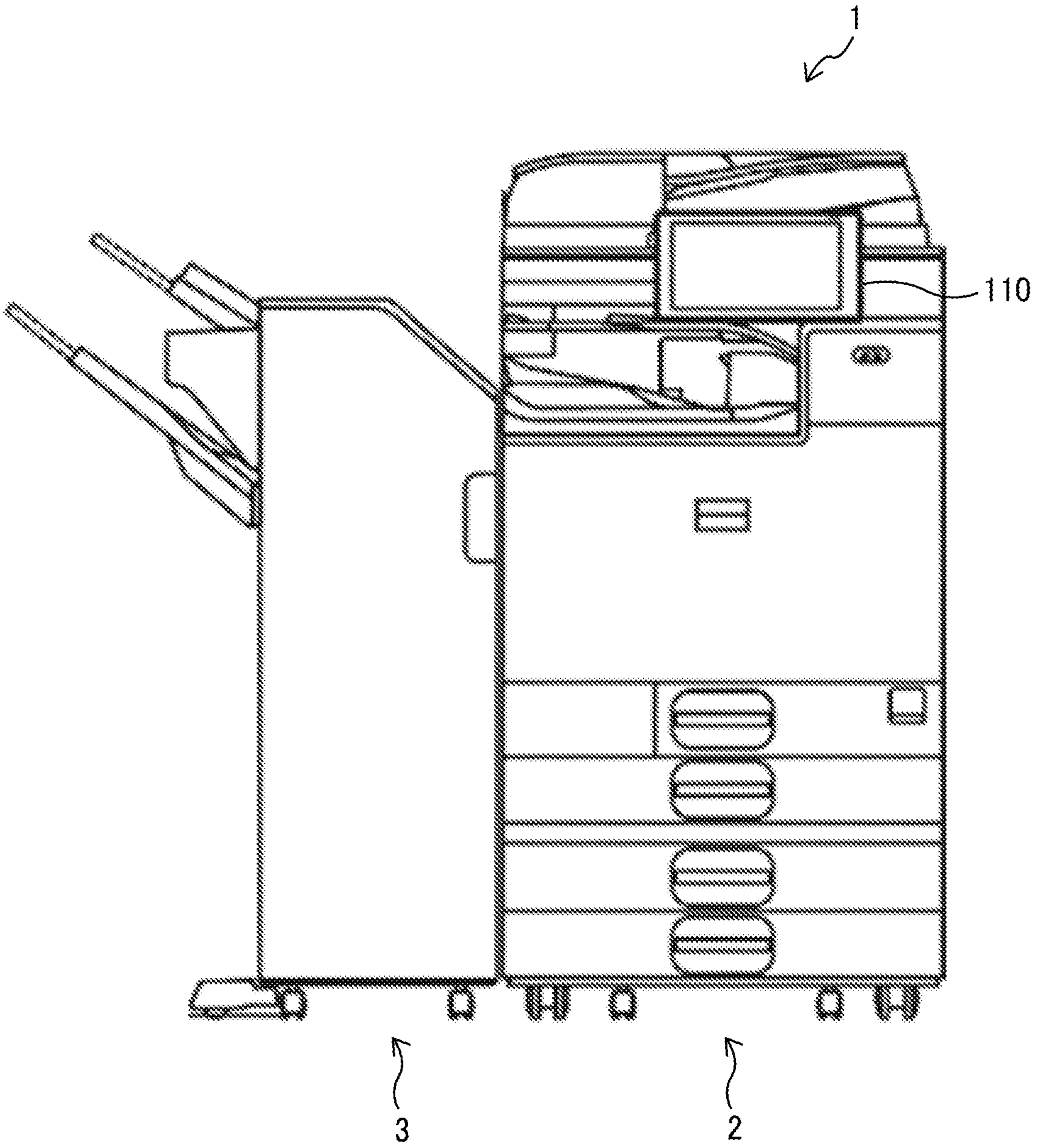
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

Hereinafter, an embodiment of the present disclosure applied to a color laser printer (hereinafter, simply referred to as a printer) that is an image forming apparatus will be described.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Initially, a description is given of a first embodiment of the present disclosure.

With reference to the drawings, a description is now given of an image forming system 1 according to an embodiment of the present disclosure. FIG. 1 is a diagram illustrating the overall configuration of the image forming system 1. The image forming system 1 has a function of forming an image on a sheet P as a medium and performing post-processing on the sheet P on which the image is formed. As illustrated in FIG. 1, the image forming system 1 includes an image forming apparatus 2 and a post-processing apparatus 3 (medium processing apparatus).

The image forming apparatus 2 forms an image on the sheet P and outputs the sheet P bearing the image to the post-processing apparatus 3. The image forming apparatus 2 includes a tray that accommodates the sheet P, a conveyor that conveys the sheet P accommodated in the tray, and an image former that forms an image on the sheet P conveyed by the conveyor. The image former may be an inkjet image forming device that forms an image with ink or an electrophotographic image forming device that forms an image with toner. Since the image forming apparatus 2 has a typical configuration, a detailed description of the configuration and functions of the image forming apparatus 2 are omitted.

Figure 2:
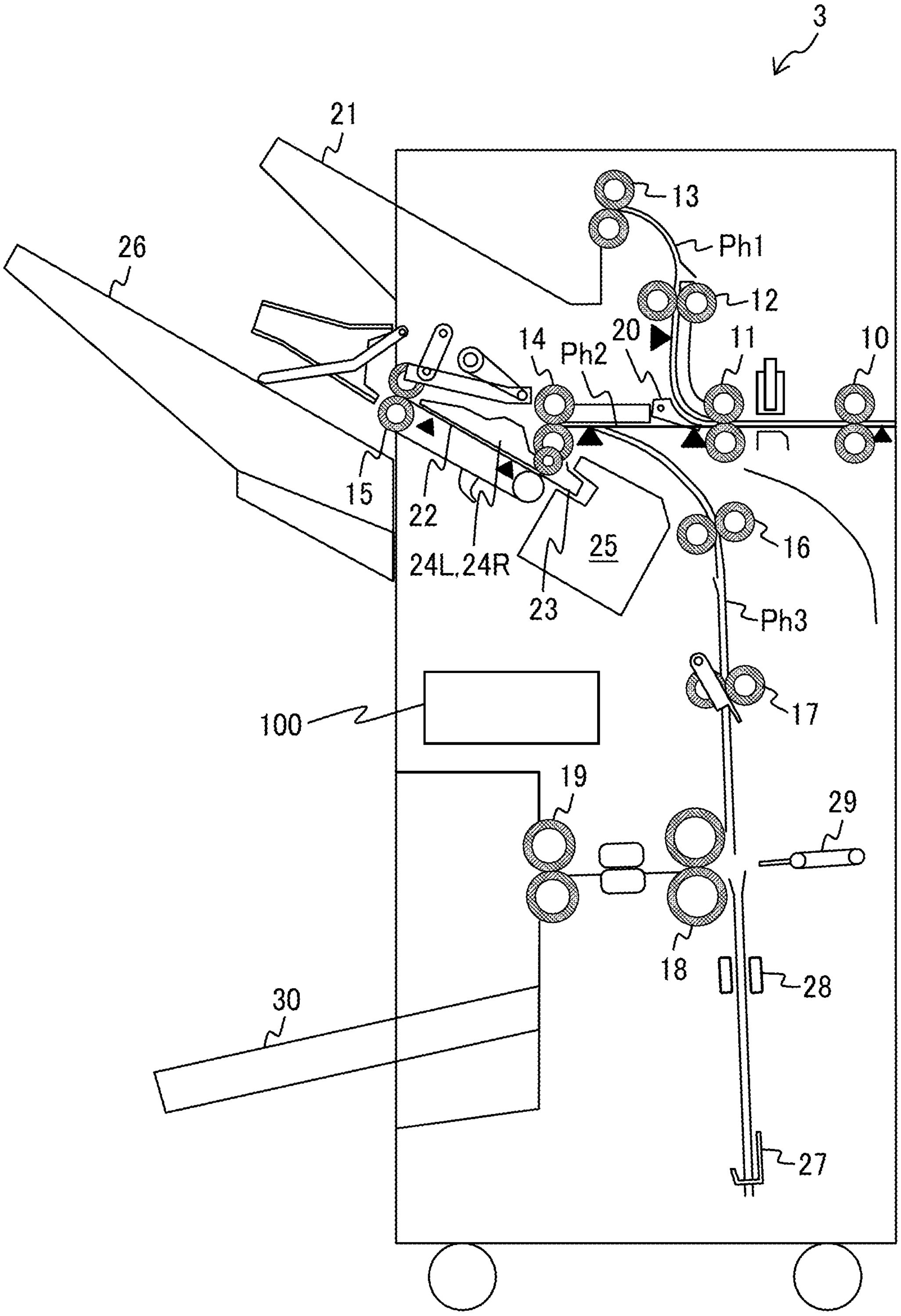
FIG. 2 is a diagram illustrating an internal configuration of a post-processing apparatus according to a first embodiment of the present disclosure.

FIG. 2 is a diagram illustrating an internal configuration of the post-processing apparatus 3 according to the first embodiment of the present disclosure. The post-processing apparatus 3 performs post-processing on the sheet P on which an image is formed by the image forming apparatus 2. The post-processing according to the present embodiment is binding as a process to bind the sheets P on each of which an image is formed as a bundle of sheets P. In the following description, the bundle of sheets P may be referred to as a "sheet bundle Pb." More specifically, the binding according to the present embodiment includes so-called "crimp binding" and "stapling." The crimp binding is a process to press and deform the sheet bundle Pb at a crimp binding position. The stapling is a process to bind the sheet bundle Pb with a staple. The crimp binding includes edge stitching and saddle stitching. The edge stitching is a process to bind an edge of the sheet bundle Pb. The saddle stitching is a process to bind the center of the sheet bundle Pb.

The post-processing apparatus 3 includes the conveyance roller pairs 10 to 19 each functioning as a conveyor and the switching claw 20. The conveyance roller pairs 10 to 19 convey, inside the post-processing apparatus 3, the sheet P supplied from the image forming apparatus 2. Specifically, the conveyance roller pairs 10 to 13 convey the sheet P along a first conveyance passage Ph1. The conveyance roller pairs 14 and 15 convey the sheet P along a second conveyance passage Ph2. The conveyance roller pairs 16 to 19 convey the sheet P along a third conveyance passage Ph3.

The first conveyance passage Ph1 is a passage extending to an output tray 21 from a supply port through which the sheet P is supplied from the image forming apparatus 2. The second conveyance passage Ph2 is a passage branching from the first conveyance passage Ph1 between the conveyance roller pairs 11 and 14 and extending to an output tray 26 via an internal tray 22. The third conveyance passage Ph3 is a passage branching from the first conveyance passage Ph1 between the conveyance roller pairs 11 and 14 and extending to an output tray 30.

The switching claw 20 is disposed at a branching position of the first conveyance passage Ph1 and the second conveyance passage Ph2. The switching claw 20 can be switched between a first position and a second position. The switching claw 20 in the first position guides the sheet P to be output to the output tray 21 through the first conveyance passage Ph1. The switching claw 20 in the second position guides the sheet P conveyed through the first conveyance passage Ph1 to the second conveyance passage Ph2. When a trailing end of the sheet P entering the second conveyance passage Ph2 passes through the conveyance roller pair 11, the conveyance roller pair 14 is rotated in the reverse direction to guide the sheet P to the third conveyance passage Ph3. In FIG. 2, each black triangle indicates a sensor that detects the position of the sheet P during conveyance.

The post-processing apparatus 3 includes the output tray 21. The sheet P that is output through the first conveyance passage Ph1 rests on the output tray 21. Among the sheets P supplied from the image forming apparatus 2, the sheets P that are not bound are output to the output tray 21.

The post-processing apparatus 3 further includes the internal tray 22 (tray), an end fence 23, side fences 24L and 24R, an edge binder 25, and the output tray 26. The internal tray 22, the end fence 23, the side fences 24L and 24R, and the edge binder 25 perform the edge stitching on the sheet bundle Pb constructed of a plurality of sheets P conveyed to the internal tray 22 from the second conveyance passage Ph2. The edge stitching includes parallel stitching, oblique stitching, and vertical stitching. The parallel stitching (see FIGS. 12 to 15) is a process to perform stitching along one side of the sheet bundle Pb parallel to the main scanning direction. The oblique stitching is a process to perform stitching at a corner of the sheet bundle Pb. The vertical stitching is a process to perform stitching at a plurality of positions spaced apart from each other in the width direction along one side of the sheet bundle Pb parallel to the conveyance direction. The crimp binding position at which the sheet bundle Pb is bound by the oblique stitching is an example of an "oblique edge binding position". The crimp binding position at which the sheet bundle Pb is bound by the parallel stitching or the vertical stitching is an example of an edge binding position".

Among the sheets P supplied from the image forming apparatus 2, the sheet bundle Pb subjected to the edge stitching is output to the output tray 26. In the following description, a direction in which the sheet P is conveyed from the conveyance roller pair 15 toward the end fence 23 is defined as a "conveyance direction." The term "width of the sheet (medium)" includes the length of the sheet P in a direction (main scanning direction) perpendicular to the thickness direction and the conveyance direction of the sheet P, and the length of the sheet P in the conveyance direction.

The sheets P that are sequentially conveyed through the second conveyance passage Ph2 are temporarily placed on the internal tray 22. The end fence 23 aligns the position, in the conveyance direction, of the sheet P or the sheet bundle Pb placed on the internal tray 22. The side fences 24L and 24R align the position, in the main scanning direction, of the sheet P or the sheet bundle Pb placed on the internal tray 22. The edge binder 25 binds an end of the sheet bundle Pb aligned by the end fence 23 and the side fences 24L and 24R. Then, the conveyance roller pair 15 outputs the sheet bundle Pb subjected to the edge stitching to the output tray 26.

Figure 3:
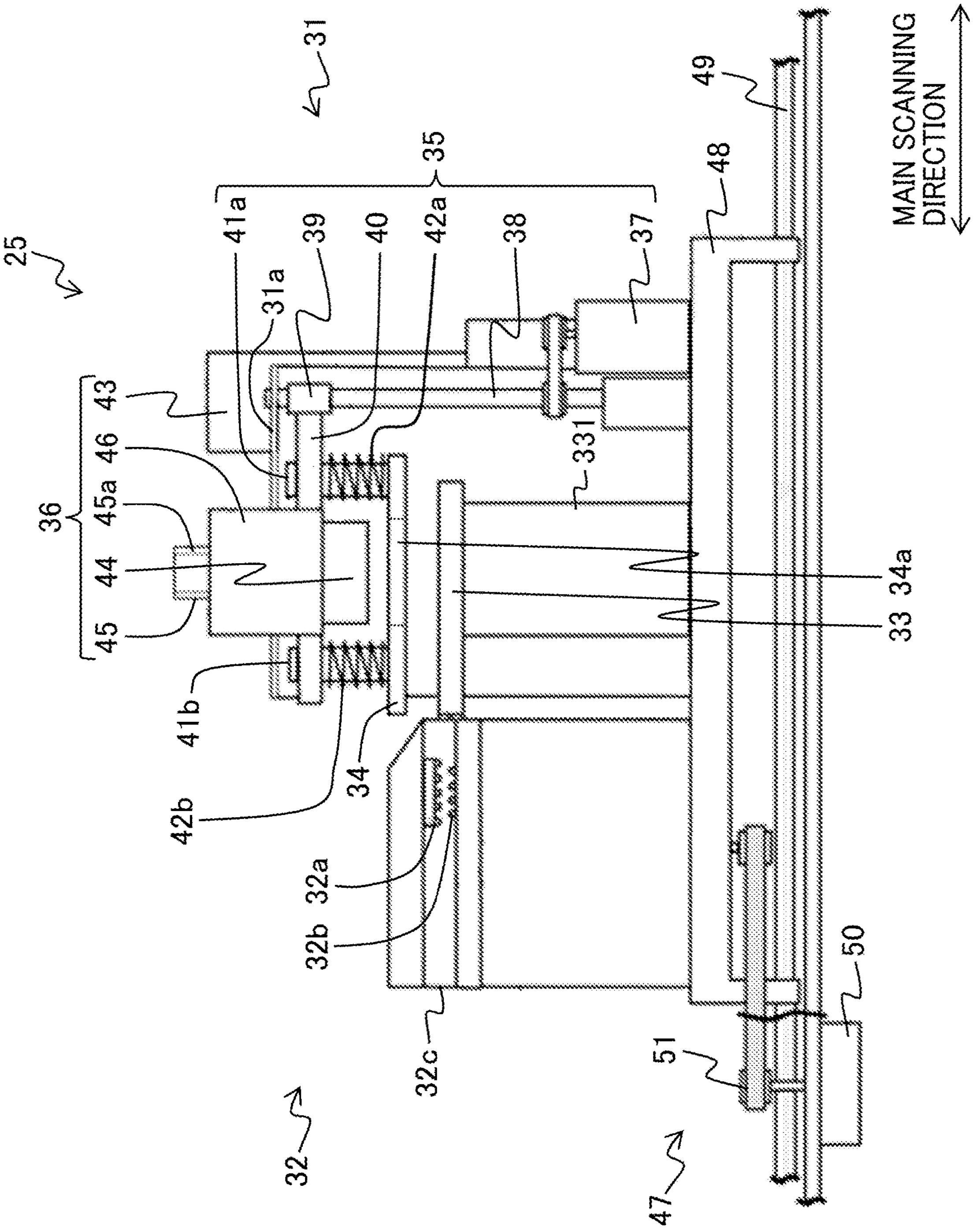
FIG. 3 is a schematic view of an upstream side of an edge binder of the post-processing apparatus of FIG. 2 in a conveyance direction.
Figure 4:
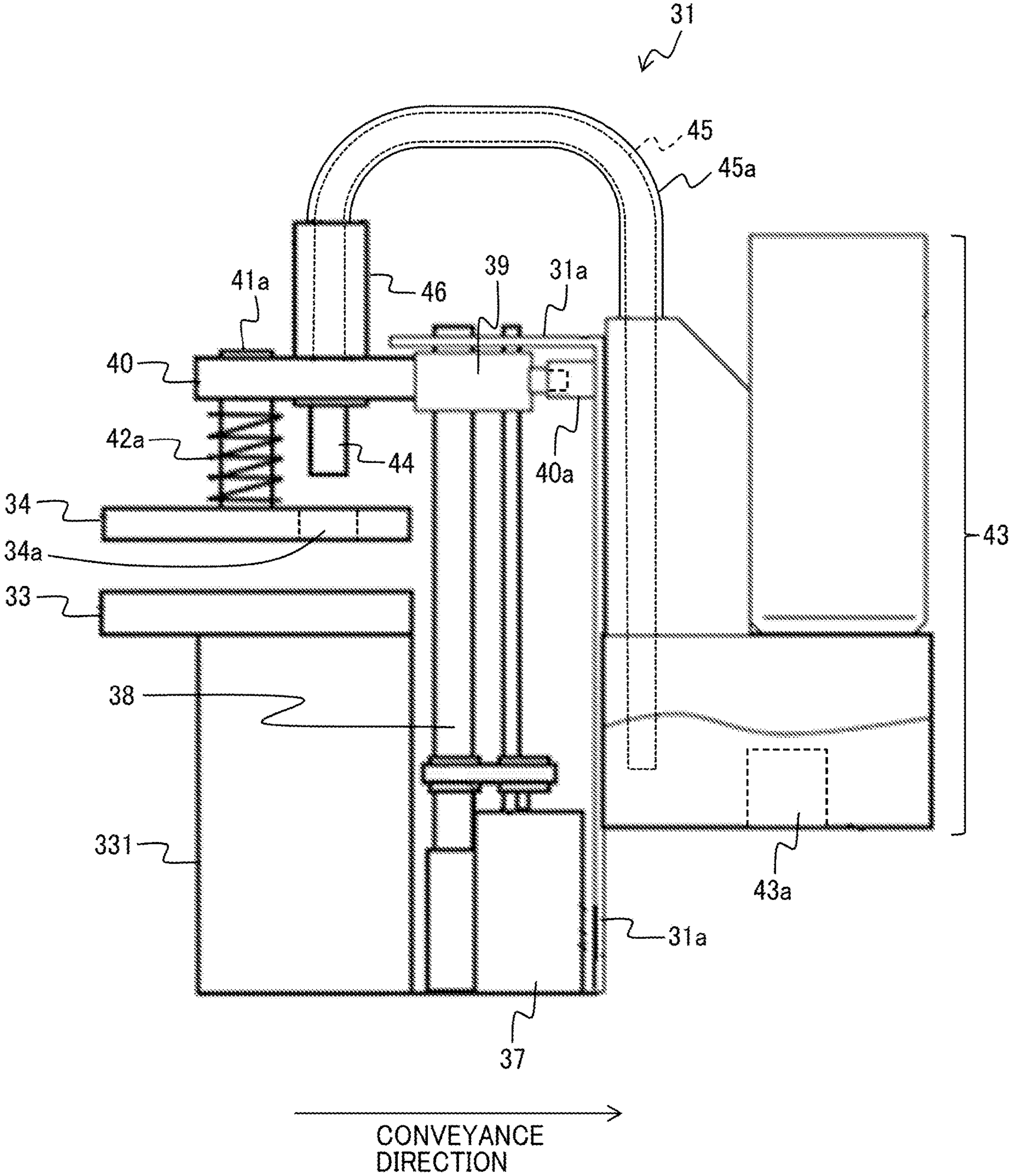
FIG. 4 is a schematic view of a liquid applier of the edge binder of FIG. 3 in a main scanning direction.

FIG. 3 is a schematic view of an upstream side of the edge binder 25 in the conveyance direction. FIG. 4 is a schematic view of a liquid applier 31 of the edge binder 25 in the main scanning direction. As illustrated in FIGS. 3 and 4, the edge binder 25 includes a liquid applier 31 that applies liquid and a crimper 32 that performs crimping and binding. The liquid applier 31 and the crimper 32 are disposed adjacent to each other in the main scanning direction downstream from the internal tray 22 in the conveyance direction.

The liquid applier 31 applies liquid (for example, water) that is stored in a liquid storage tank 43 to the sheet P or the sheet bundle Pb placed on the internal tray 22. In the following description, the application of liquid may be referred to as "liquid application."

More specifically, the liquid that is stored in the liquid storage tank 43 and used for the "liquid application" includes, as a main component, a liquid hydrogen-oxygen compound represented by the chemical formula $H_2O$. The liquid hydrogen-oxygen compound is at any temperature. For example, the liquid hydrogen-oxygen compound may be so-called warm water or hot water. The liquid hydrogen-oxygen compound is not limited to pure water. The liquid hydrogen-oxygen compound may be purified water or may contain ionized salts. The metal ion content ranges from so-called soft water to ultrahard water. In other words, the liquid hydrogen-oxygen compound is at any hardness.

The liquid that is stored in a liquid storage tank 43 may include an additive in addition to the main component. The liquid that is stored in the liquid storage tank 43 may include residual chlorine used as tap water. Preferably, for example, the liquid that is stored in the liquid storage tank 43 may include, as an additive, a colorant, a penetrant, a pH adjuster, a preservative such as phenoxyethanol, a drying inhibitor such as glycerin, or a combination thereof. Since water is used as a component of ink used for inkjet printers or ink used for water-based pens, such water or ink may be used for the "liquid application."

The water is not limited to the specific examples described above. The water may be water in a broad sense such as hypochlorous acid water or an ethanol aqueous solution diluted for disinfection. However, tap water may be used simply for the crimp binding because tap water is easy to obtain and store. A liquid including water as a main component as exemplified above enhances the binding strength of the sheet bundle Pb, as compared with a liquid of which the main component is not water.

The liquid applier 31 can be moved in the main scanning direction together with the crimper 32 by a driving force transmitted from the edge binder movement motor 50. A liquid application position to which the liquid is applied on the sheet P or the sheet bundle Pb by the liquid applier 31 corresponds to the crimp binding position at which the sheet P or the sheet bundle Pb is to be crimped and bound by the crimper 32. For this reason, in the following description, the liquid application position and the crimp binding position are denoted by the same reference numeral.

As illustrated in FIGS. 3 and 4, the liquid applier 31 includes a lower pressure plate 33, an upper pressure plate 34 (presser), a liquid applier movement assembly 35, and a liquid application assembly 36. The components of the liquid applier 31 such as the lower pressure plate 33, the upper pressure plate 34, the liquid applier movement assembly 35, and the liquid application assembly 36 are held by a liquid application frame 31*a* and a base 48.

The lower pressure plate 33 and the upper pressure plate 34 are disposed downstream from the internal tray 22 in the conveyance direction. The lower pressure plate 33 supports, from below, the sheet P or the sheet bundle Pb placed on the internal tray 22. The lower pressure plate 33 is disposed on a lower-pressure-plate holder 331. The upper pressure plate 34 can move (up and down) in the thickness direction of the sheet P above the sheet P or the sheet bundle Pb placed on the internal tray 22. In other words, the lower pressure plate 33 and the upper pressure plate 34 are disposed to face each other in the thickness direction of the sheet P or the sheet bundle Pb with the sheet P or the sheet bundle Pb placed on the internal tray 22 and interposed between the lower pressure plate 33 and the upper pressure plate 34. In the following description, the thickness direction of the sheet P or the sheet bundle Pb may be referred to simply as "thickness direction." The upper pressure plate 34 has a through hole 34*a* penetrating in the thickness direction at a position where the through hole 34*a* faces an end of a liquid application member 44 attached to a base plate 40.

The liquid applier movement assembly 35 moves the upper pressure plate 34, the base plate 40, and the liquid application member 44 in the thickness direction of the sheet P or the sheet bundle Pb. The liquid applier movement assembly 35 according to the present embodiment moves the upper pressure plate 34, the base plate 40, and the liquid application member 44 in conjunction with each other with a single liquid applier movement motor 37. The liquid applier movement assembly 35 includes, for example, the liquid applier movement motor 37, a trapezoidal screw 38, a nut 39, the base plate 40, columns 41*a* and 41*b*, and coil springs 42*a* and 42*b*.

The liquid applier movement motor 37 generates a driving force to move the upper pressure plate 34, the base plate 40, and the liquid application member 44. The trapezoidal screw 38 extends in a vertical direction in FIGS. 3 and 4 and is rotatably attached to the liquid application frame 31*a*. The trapezoidal screw 38 is coupled to an output shaft of the liquid applier movement motor 37 via, for example, a pulley and a belt. The nut 39 is screwed to the trapezoidal screw 38. The trapezoidal screw 38 is rotated by the driving force transmitted from the liquid applier movement motor 37. The rotation of the trapezoidal screw 38 moves the nut 39.

Figure 6:
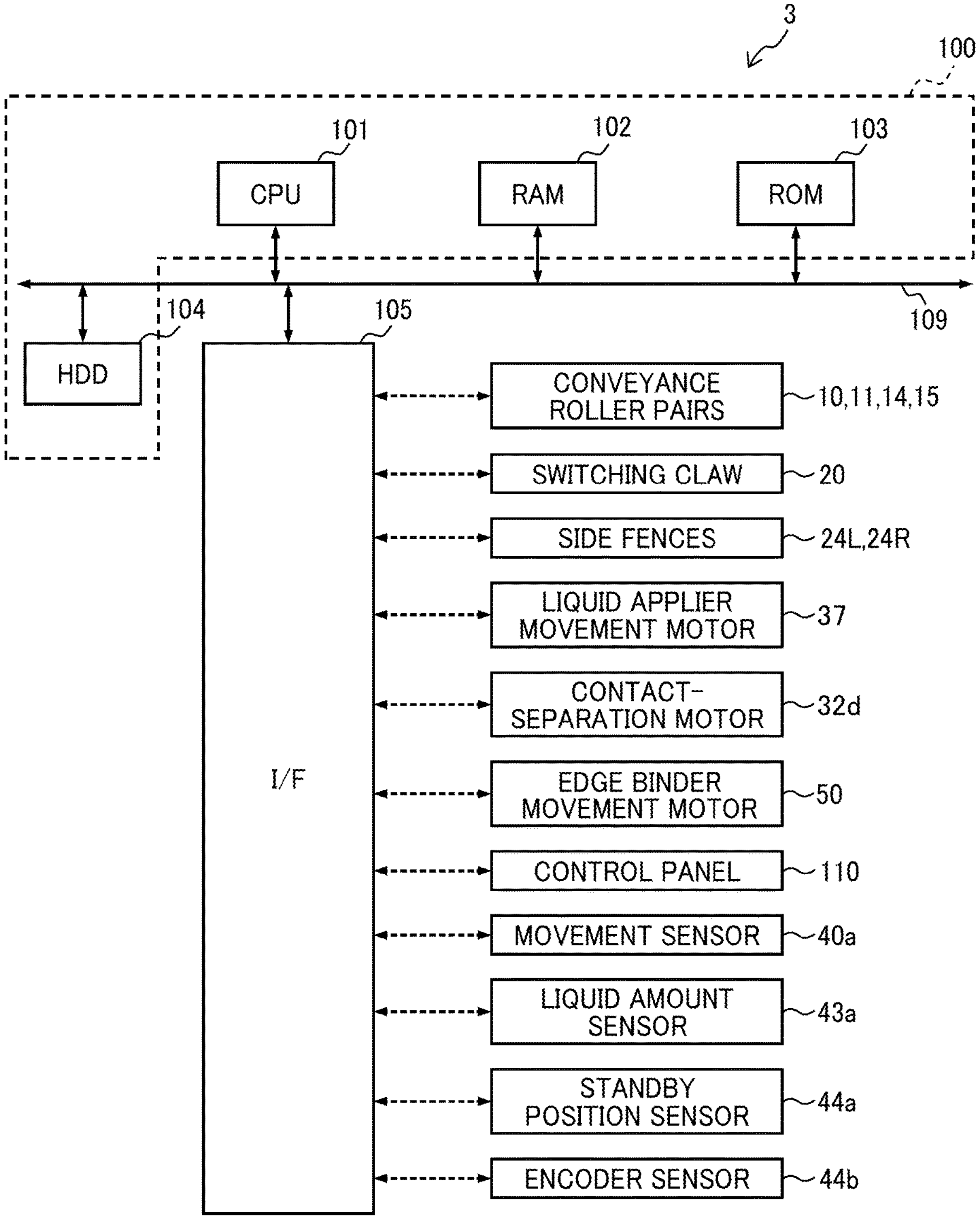
FIG. 6 is a block diagram illustrating a hardware configuration of the post-processing apparatus of FIG. 2 to control the operation of the post-processing apparatus.

The base plate 40 is disposed above the upper pressure plate 34. The base plate 40 holds the liquid application member 44 with the end of the liquid application member 44 projecting downward. The base plate 40 is coupled to the trapezoidal screw 38 to move together with the trapezoidal screw 38. The position of the base plate 40 in the vertical direction is detected by a movement sensor 40*a* as illustrated in FIG. 6.

The columns 41*a* and 41*b* project downward from the base plate 40 around the end of the liquid application member 44. The columns 41*a* and 41*b* can move relative to the base plate 40 in the thickness direction. The columns 41*a* and 41*b* have respective lower ends holding the upper pressure plate 34. The columns 41*a* and 41*b* have respective upper ends provided with stoppers that prevent the columns 41*a* and 41*b* from being removed from the base plate 40. The coil springs 42*a* and 42*b* are fitted around the columns 41*a* and 41*b*, respectively, between the base plate 40 and the upper pressure plate 34. The coil springs 42*a* and 42*b* bias the upper pressure plate 34 and the columns 41*a* and 41*b* downward with respect to the base plate 40.

The liquid application assembly 36 applies liquid to the sheet P or the sheet bundle Pb placed on the internal tray 22. Specifically, the liquid application assembly 36 brings the end of the liquid application member 44 into contact with the sheet P or the sheet bundle Pb to apply the liquid to at least one sheet P of the sheet bundle Pb. The liquid application assembly 36 includes the liquid storage tank 43, the liquid application member 44, a supplier 45, and a joint 46.

The liquid storage tank 43 stores the liquid to be supplied to the sheet P or the sheet bundle Pb. The amount of liquid that is stored in the liquid storage tank 43 is detected by a liquid amount sensor 43*a*. The liquid application member 44 applies the liquid stored in the liquid storage tank 43 to the sheet P or the sheet bundle Pb. The liquid application member 44 is mounted on the base plate 40 with an end of the liquid application member 44 facing downward. The liquid application member 44 is made of a material having a relatively high liquid absorption (for example, sponge or fiber).

The supplier 45 is an elongated member having a base end immersed in the liquid stored in the liquid storage tank 43 and another end coupled to the liquid application member 44. Like the liquid application member 44, for example, the supplier 45 is made of a material having a relatively high liquid absorption. Accordingly, the liquid absorbed from the base end of the supplier 45 is supplied to the liquid application member 44 by capillary action.

A protector 45*a* is an elongated cylindrical body (for example, a tube) that is fitted around the supplier 45. Such a configuration prevents the liquid absorbed by the supplier 45 from leaking or evaporating. Each of the supplier 45 and the protector 45*a* is made of a flexible material. The joint 46 fixes the liquid application member 44 to the base plate 40. Accordingly, the liquid application member 44 keeps projecting downward from the base plate 40 with the end of the liquid application member 44 facing downward when the liquid application member 44 is moved by the liquid applier movement assembly 35.

The crimper 32 presses and deforms at least a part (in other words, liquid application position) of the sheet bundle Pb to which liquid is applied by the liquid applier 31, with serrate binding teeth 32*a* and 32*b*, to bind the sheet bundle Pb. In the following description, such a binding way may be referred to as “crimp binding.” In other words, the crimper 32 crimps and binds the sheet bundle Pb or perform the crimp binding on the sheet bundle Pb. In short, the crimper 32 binds the sheet bundle Pb without staples. The components of the crimper 32 such as the binding teeth 32*a* serving as upper crimping teeth and the binding teeth 32*b* serving as lower crimping teeth are disposed on a crimping frame 32*c*.

Figure 5A:
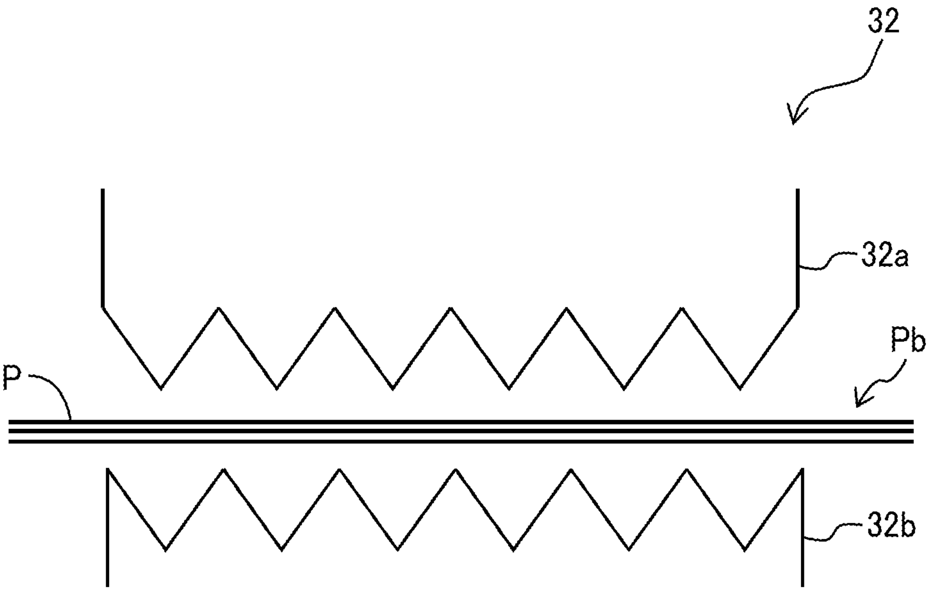
FIGS. 5A and 5B are schematic diagrams illustrating a configuration of a crimping unit according to an embodiment of the present disclosure.
Figure 5B:

FIGS. 5A and 5B are schematic diagrams illustrating a configuration of the crimper 32. As illustrated in FIGS. 5A and 5B, the crimper 32 includes the binding teeth 32*a* and the binding teeth 32*b* in pair, which may be referred to as a pair of binding teeth 32*a* and 32*b* in the following description. The binding teeth 32*a* and the binding teeth 32*b* are disposed to face each other in the thickness direction of the sheet bundle Pb so that the binding teeth 32*a* and the binding teeth 32*b* can sandwich the sheet bundle Pb placed on the internal tray 22. The binding teeth 32*a* and the binding teeth 32*b* have respective serrate faces facing each other. The serrate face of each of the binding teeth 32*a* and the binding teeth 32*b* includes concave portions and convex portions alternately formed. The concave portions and the convex portions of the binding teeth 32*a* are shifted from those of the binding teeth 32*b* such that the binding teeth 32*a* are engaged with the binding teeth 32*b*. The binding teeth 32*a* and the binding teeth 32*b* are brought into contact with and separated from each other by a driving force of a contact-separation motor 32*d* illustrated in FIG. 6.

In a process in which the sheets P of the sheet bundle Pb are supplied to the internal tray 22, the binding teeth 32*a* and the binding teeth 32*b* are apart from each other as illustrated in FIG. 5A. When all the sheets P of the sheet bundle Pb are placed on the internal tray 22, the binding teeth 32*a* and the binding teeth 32*b* are engaged with each other to press and deform the sheet bundle Pb in the thickness direction as illustrated in FIG. 5B. As a result, the sheet bundle Pb that has been placed on the internal tray 22 is crimped and bound. The sheet bundle Pb thus crimped and bound is output to the output tray 26 by the conveyance roller pair 15.

The configuration of the crimper 32 as a crimping assembly is not limited to the configuration of the present embodiment and may be any other configuration in which the binding teeth 32*a* and the binding teeth 32*b* of the crimping assembly are engaged with each other. The crimping assembly may be a crimping assembly disclosed in Japanese Patent No. 6057167 or its corresponding U.S. Patent Application Publication No. 2014-0219747, which is hereby incorporated by reference as though disclosed herein in its entirety. In this case, the crimping assembly brings the binding teeth 32*a* and the binding teeth 32*b* into contact with each other and separate the binding teeth 32*a* and the binding teeth 32*b* form each other with a link assembly and a driving source that simply rotates forward or that rotates forward and backward. Alternatively, the crimping assembly may employ a linear motion system to linearly bring the binding teeth 32*a* and the binding teeth 32*b* into contact with each other and separate the binding teeth 32*a* and the binding teeth 32*b* from each other with a screw assembly that converts the rotational motion of a driving source into linear motion.

As illustrated in FIG. 3, the edge binder 25 includes an edge binder movement assembly 47. The edge binder movement assembly 47 moves the edge binder 25, specifically, the liquid applier 31 and the crimper 32, in the main scanning direction along a downstream end in the conveyance direction of the sheet P placed on the internal tray 22. The edge binder movement assembly 47 includes, for example, the base 48, a guide shaft 49, an edge binder movement motor 50, and a driving force transmission assembly 51.

The liquid applier 31 and the crimper 32 are attached to the base 48 such that the liquid applier 31 and the crimper 32 are adjacent to each other in the main scanning direction. The guide shaft 49 extends in the main scanning direction at a position downstream from the internal tray 22 in the conveyance direction of the sheet P. The guide shaft 49 supports the base 48 such that the base 48 can move in the main scanning direction. The edge binder movement motor 50 generates a driving force to move the edge binder 25. The driving force transmission assembly 51 transmits the driving force of the edge binder movement motor 50 to the base 48 via a pulley and a timing belt. As a result, the liquid applier 31 and the crimper 32 integrated by the base 48 move in the main scanning direction along the guide shaft 49.

The edge binder movement motor 50 according to the present embodiment is, for example, a servo motor that can stop the edge binder 25 at a target position (crimp binding positions B1 and B2 described later) without returning the edge binder 25 to an origin position (for example, a standby position HP described later) every time the edge binder 25 is moved.

The post-processing apparatus 3 further includes a standby position sensor 44*a* and an encoder sensor 44*b*. The standby position sensor 44*a* (for example, a light-shielding optical sensor; see FIG. 6) detects a home position at which the edge binder 25 reaches the standby position HP. The encoder sensor 44*b* (see FIG. 6) is attached to the shaft of the edge binder movement motor 50. The controller 100, which will be described later, detects that the edge binder 25 has reached the standby position HP, based on a detection result of the standby position sensor 44*a*. The controller 100 also counts pulse signals output from the encoder sensor 44*b* to grasp the current position of the edge binder 25 moved from the standby position HP.

However, a specific method of stopping the edge binder 25 at the target position without returning the edge binder 25 to the origin position is not limited to the above-described example. As another example, the post-processing apparatus 3 may include a sensor that detects that the edge binder 25 has reached a predetermined target position.

That is, the edge binder movement assembly 47 can move the edge binder 25 by the shortest distance between the position at which the liquid applier 31 faces a first crimp binding position B1 and the position at which the liquid applier 31 faces a second crimp binding position B2 without passing through the standby position HP. The edge binder movement assembly 47 can also move the edge binder 25 by the shortest distance between the position at which the crimper 32 faces the first crimp binding position B1 and the position at which the crimper 32 faces the second crimp binding position B2 without passing through the standby position HP. Further, the edge binder movement assembly 47 can move the edge binder 25 by the shortest distance between the position at which the liquid applier 31 faces the first crimp binding position B1 (or the second crimp binding position B2) and the position at which the crimper 32 faces the first crimp binding position B1 (or the second crimp binding position B2) without passing through the standby position HP.

Referring back to FIG. 2, the post-processing apparatus 3 further includes an end fence 27, a saddle binder 28, a sheet folding blade 29, and the output tray 30. The end fence 27, the saddle binder 28, and the sheet folding blade 29 perform the saddle stitching on the sheet bundle Pb constructed of the sheets P that are conveyed through the third conveyance passage Ph3. Among the sheets P supplied from the image forming apparatus 2, the sheet bundle Pb subjected to the saddle stitching is output to the output tray 30.

The end fence 27 aligns the positions of the sheets P that are sequentially conveyed through the third conveyance passage Ph3, in a direction in which the sheets P are conveyed. The end fence 27 can move between a binding position where the end fence 27 causes the center of the sheet bundle Pb to face the saddle binder 28 and a folding position where the end fence 27 causes the center of the sheet bundle Pb to face the sheet folding blade 29. The saddle binder 28 binds the center of the sheet bundle Pb aligned by the end fence 27 at the binding position. The sheet folding blade 29 folds, in half, the sheet bundle Pb placed on the end fence 27 at the folding position and causes the conveyance roller pair 18 to sandwich the sheet bundle Pb. The conveyance roller pairs 18 and 19 output the sheet bundle Pb subjected to the saddle stitching to the output tray 30.

FIG. 6 is a block diagram illustrating a hardware configuration of the post-processing apparatus 3 to control the operation of the post-processing apparatus 3 according to the first embodiment of the present disclosure. As illustrated in FIG. 6, the post-processing apparatus 3 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected to each other via a common bus 109.

The CPU 101 is an arithmetic unit and controls the overall operation of the post-processing apparatus 3. The RAM 102 is a volatile storage medium that allows data to be read and written at high speed. The CPU 101 uses the RAM 102 as a working area for data processing. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3 processes, for example, a control program stored in the ROM 103 and an information processing program (application program) loaded into the RAM 102 from a storage medium such as the HDD 104. Such processing configures a software controller including various functional modules of the post-processing apparatus 3. The software controller thus configured cooperates with hardware resources of the post-processing apparatus 3 to construct functional blocks that implement functions of the post-processing apparatus 3. In other words, the CPU 101, the RAM 102, the ROM 103, and the HDD 104 construct a controller 100 that controls the operation of the post-processing apparatus 3.

The I/F 105 is an interface that connects the conveyance roller pairs 10, 11, 14, and 15, the switching claw 20, the side fences 24L and 24R, the contact-separation motor 32*d*, the liquid applier movement motor 37, the edge binder movement motor 50, the movement sensor 40*a*, the liquid amount sensor 43*a*, the standby position sensor 44*a*, the encoder sensor 44*b*, and a control panel 110 to the common bus 109. The controller 100 operates the conveyance roller pairs 10, 11, 14, and 15, the switching claw 20, the side fences 24L and 24R, the contact-separation motor 32*d*, the liquid applier movement motor 37, and the edge binder movement motor 50 through the I/F 105, and acquires detection results from the movement sensor 40*a*, the liquid amount sensor 43*a*, the standby position sensor 44*a*, and the encoder sensor 44*b*. Although FIG. 6 illustrates the components that execute the edge stitching, the components that execute the saddle stitching are controlled by the controller 100 like the components that execute the edge stitching.

As illustrated in FIG. 1, the image forming apparatus 2 includes the control panel 110. The control panel 110 includes an operation unit that receives instructions input by a user and a display serving as a notifier that notifies the user of information. The operation unit as an input device includes, for example, hard keys and a touch screen overlaid on a display. The control panel 110 acquires information from the user through the operation unit and provides information to the user through the display. Note that a specific example of the notifier is not limited to the display and may be a light emitting diode (LED) lamp or a speaker. The post-processing apparatus 3 may include the control panel 110 like the control panel 110 described above.

Next, with reference to FIGS. 7, 8A, 8B, 8C, 9A, 9B, and 9C, an edge binder 25' that is a modification of the edge binder 25 will be described. A difference of the edge binder 25' from the edge binder 25 according to the first embodiment is that the liquid applier 31 and the crimper 32 are integrated as a single unit. In the following description, components like those of the edge binder 25 according to the first embodiment are denoted by like reference numerals, and redundant descriptions thereof may be omitted.

Figure 7:
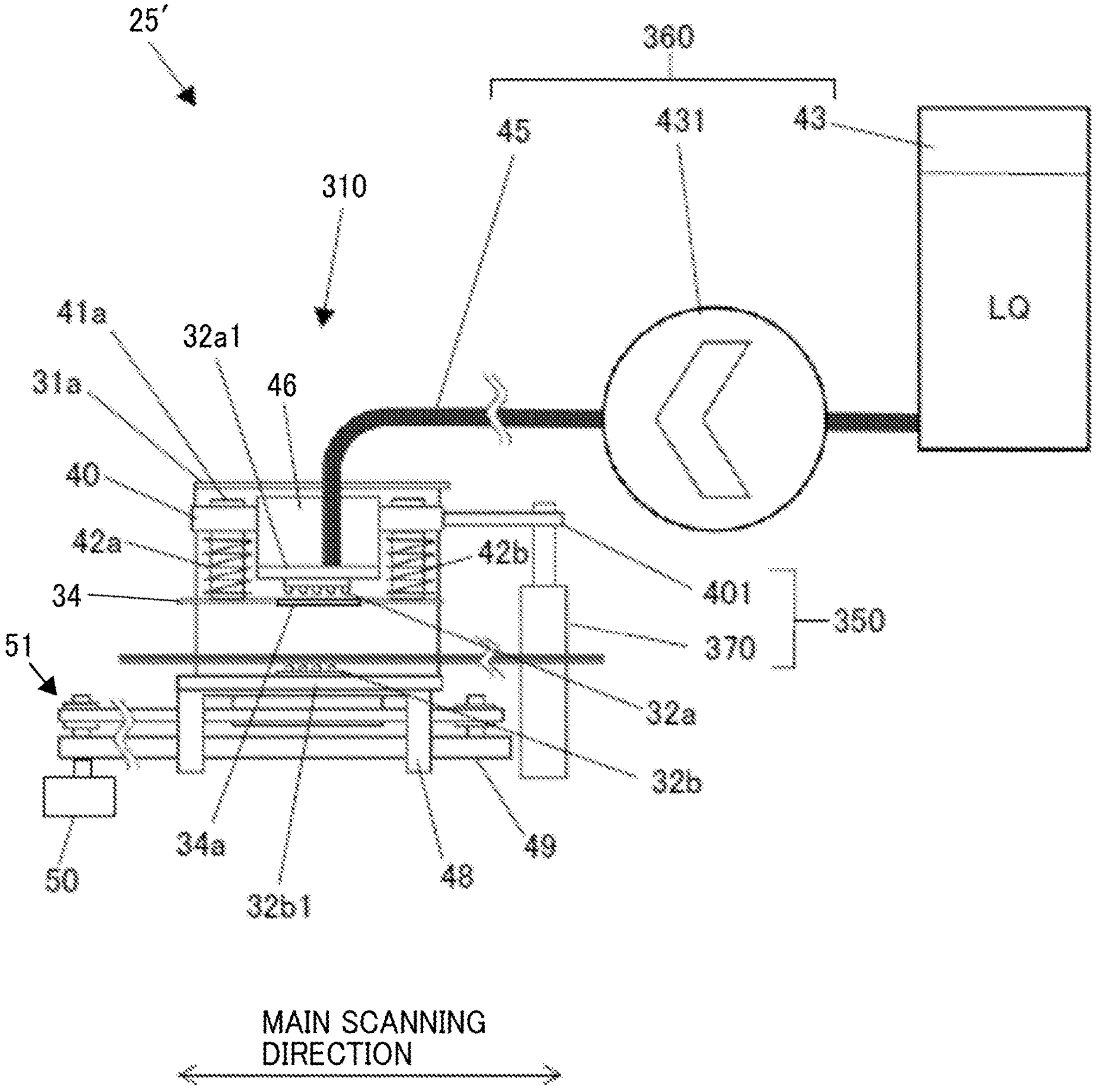
FIG. 7 is a diagram illustrating a modification of the edge binder of FIG. 3.
Figure 8A:
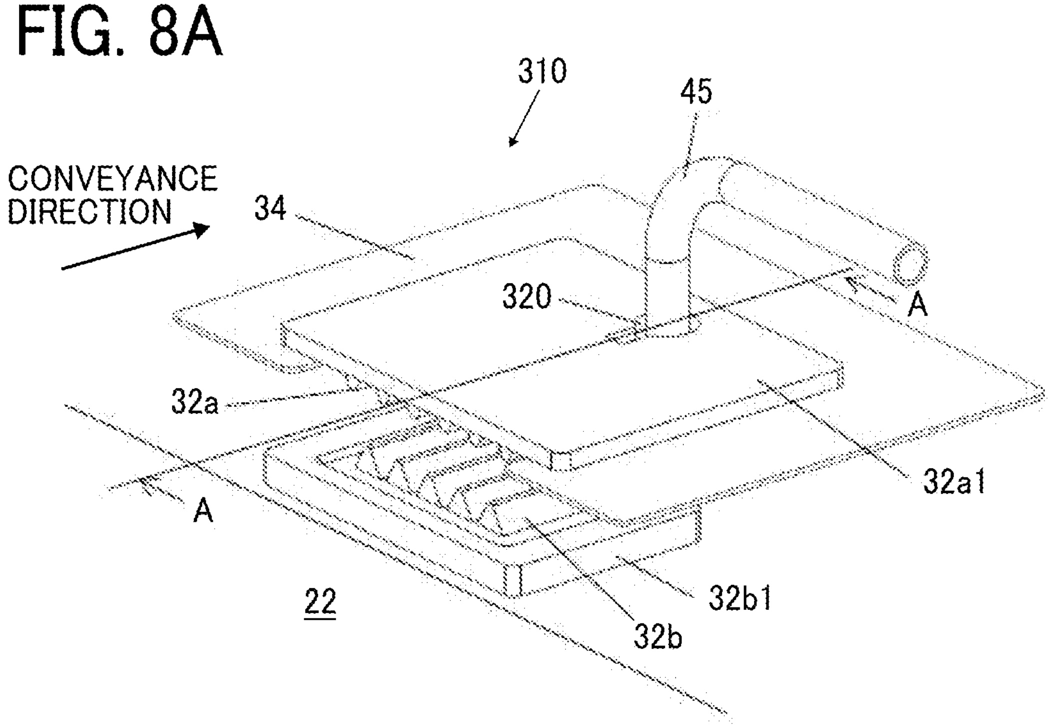
FIGS. 8A, 8B, and 8C are diagrams illustrating a liquid application crimper in the edge binder of FIG. 7.
Figure 8B:
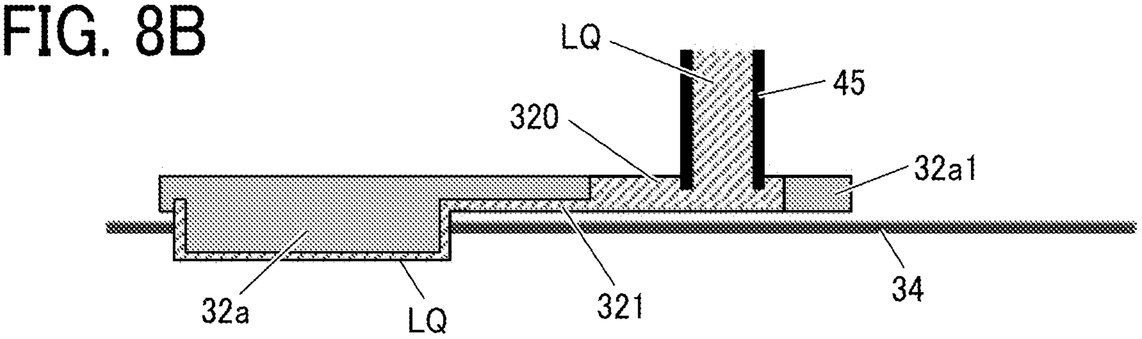
Figure 8C:
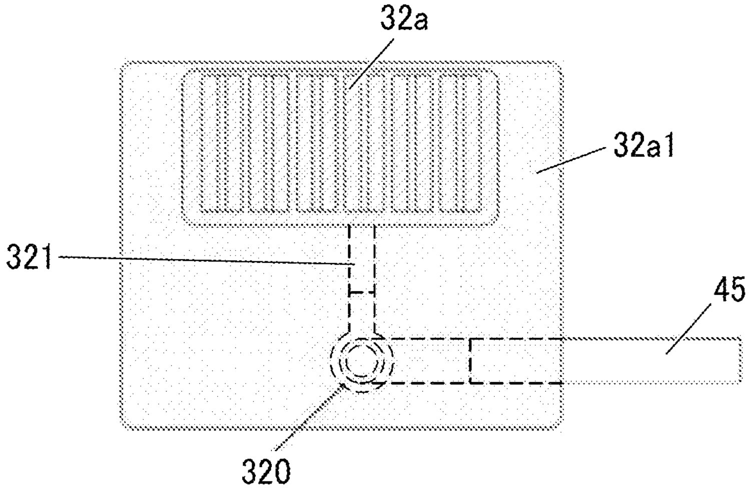
Figure 9A:
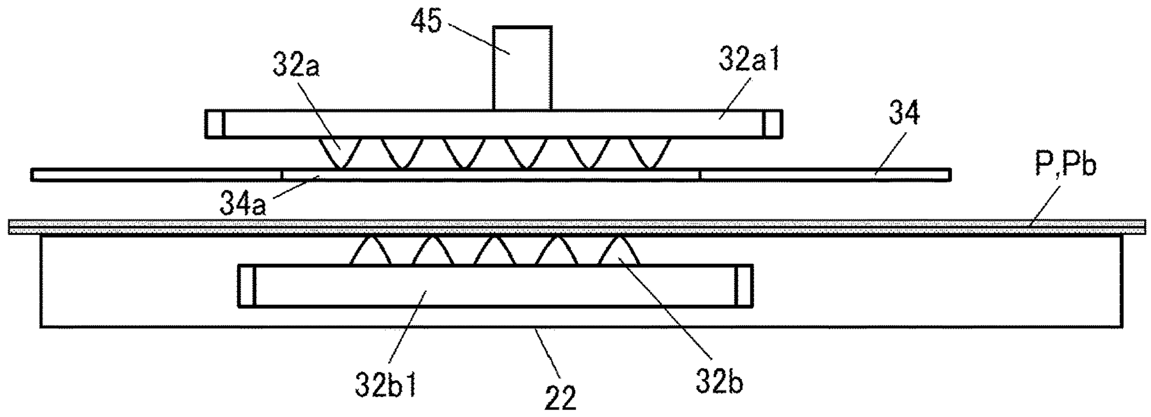
FIGS. 9A, 9B, and 9C are diagrams illustrating a liquid applying operation and a crimp binding operation by the liquid application crimper of FIGS. 8A to 8C.
Figure 9B:
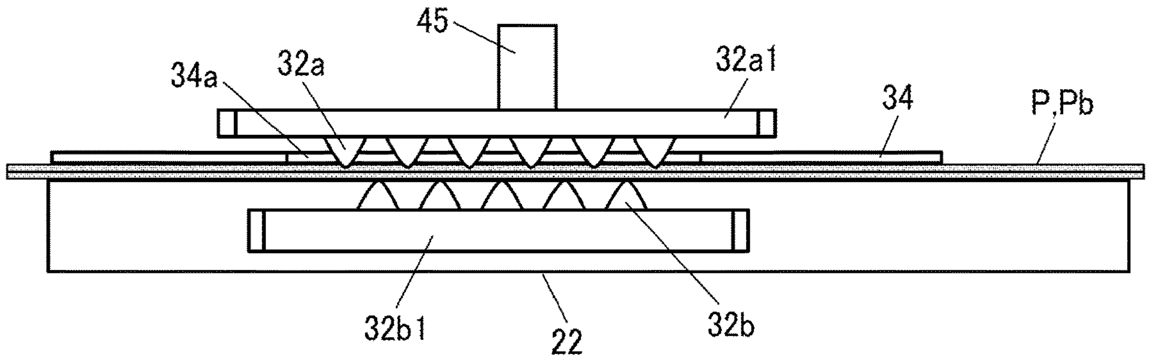
Figure 9C:
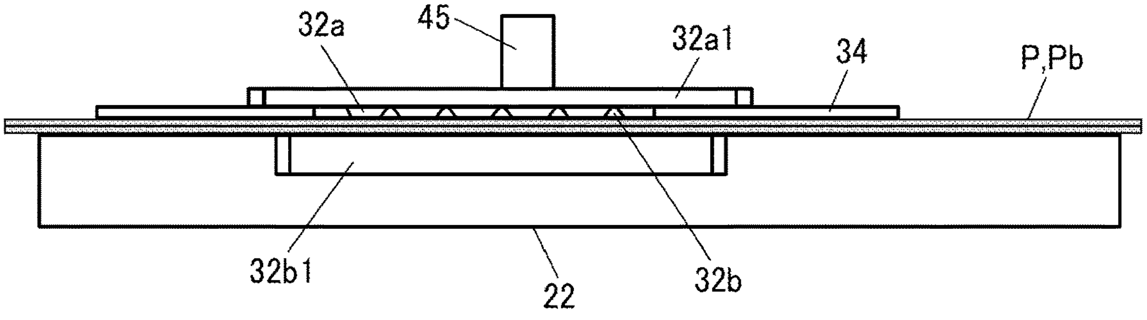

FIG. 7 is a schematic view of the edge binder 25' viewed from the upstream side in the conveyance direction. FIG. 8A is a perspective view of a liquid application crimper 310. FIG. 8B is a cross-sectional view of the liquid application crimper 310 taken along line A-A in FIG. 8A. FIG. 8C is a plan view of the upper crimping teeth 32*a* of FIG. 8A as viewed from the side at which the lower crimping teeth 32*b* is disposed. FIGS. 9A, 9B, and 9C illustrate a liquid application operation and a crimp binding operation performed by the liquid application crimper 310 and are schematic views of the liquid application crimper 310 viewed from the downstream side in the conveyance direction.

As illustrated in FIG. 7, the edge binder 25' includes a liquid application crimper 310 in which the liquid applier 31 and the crimper 32 of the edge binder 25 according to the first embodiment are integrated as a single unit. The liquid application crimper 310 is disposed downstream from the internal tray 22 in the conveyance direction.

The liquid application crimper 310 applies liquid LQ stored in the liquid storage tank 43 to a sheet P or a sheet bundle Pb placed on the internal tray 22. The liquid application crimper 310 is configured to be movable in the main scanning direction by the driving force transmitted from the edge binder movement motor 50. The liquid application crimper 310 includes the upper pressure plate 34, the upper crimping teeth 32*a*, the lower crimping teeth 32*b*, a liquid application crimper movement assembly 350, and a liquid supply assembly 360. Components of the liquid application crimper 310 are held by the liquid application frame 31*a* and the base 48.

The liquid application crimper movement assembly 350 moves the upper pressure plate 34, the base plate 40, and the upper crimping teeth 32*a* in conjunction with each other in the thickness direction of the sheet P or the sheet bundle Pb by an electric cylinder 370. The base plate 40 holds an upper crimping teeth holder 32*a*1 and the upper crimping teeth 32*a* via a joint 46. The base plate 40 movably holds the upper pressure plate 34 via the columns 41*a* and 41*b*. The base plate 40 is attached to the distal end of a rod 371 of the electric cylinder 370 via a connecter 401.

The columns 41*a* and 41*b* hold the upper pressure plate 34 at lower ends of the columns 41*a* and 41*b*. The coil springs 42*a* and 42*b* are fitted around the columns 41*a* and 41*b*, respectively, between the base plate 40 and the upper pressure plate 34. The coil springs 42*a* and 42*b* bias the upper pressure plate 34 and the columns 41*a* and 41*b* downward with respect to the base plate 40.

The liquid supply assembly 360 includes a liquid storage tank 43, a supply pump 431, and a supplier 45. The supply pump 431 feeds the liquid LQ via the supplier 45 to a liquid reservoir 320 of the upper crimping teeth holder 32*a*1 as illustrated in FIG. 8A. The supplier 45 has a proximal end connected to the supply pump 431 and a distal end connected to the liquid reservoir 320, and is formed of an elastic elongated member.

As illustrated in FIG. 8B, the upper crimping teeth 32*a* are integrated with the upper crimping teeth holder 32*a*1. The upper crimping teeth holder 32*a*1 is provided with the liquid reservoir 320 and a liquid supply path 321 for supplying the liquid LQ stored in the liquid reservoir 320 to the upper crimping teeth 32*a*. The surfaces of the upper crimping teeth 32*a* are subjected to a hydrophilic treatment so that the liquid LQ supplied from the liquid supply path 321 uniformly spreads over the surfaces of the upper crimping teeth 32*a*. On the other hand, the portions of the upper crimping teeth holder 32*a*1 other than the upper crimping teeth 32*a* are subjected to a hydrophobic treatment so that the liquid LQ efficiently spreads over the surfaces of the upper crimping teeth 32*a*.

As illustrated in FIG. 7, the lower crimping teeth 32*b* are integrated with the lower crimping teeth holder 32*b*1 as a single unit and are mounted on the base 48 via the lower crimping teeth holder 32*b*1.

Next, the liquid application operation and the crimp binding operation by the liquid application crimper 310 will be described with reference to FIGS. 9A, 9B, and 9C. In the process of supplying a sheet P to the internal tray 22, as illustrated in FIG. 9A, the upper crimping teeth 32*a* and the lower crimping teeth 32*b* are separated from each other. When the sheet P is placed on the internal tray 22, the electric cylinder 370 is contracted to move the upper crimping teeth 32*a* and the upper pressure plate 34 toward the sheet P. Then, as illustrated in FIG. 9B, the upper pressure plate 34 first comes into contact with the sheet P, and then the upper crimping teeth 32*a* pass through the through-hole 34*a* of the upper pressure plate 34 and come into contact with the sheet P. At this time, since the liquid LQ is spread over the surfaces of the upper crimping teeth 32*a*, bringing the upper crimping teeth 32*a* into contact with the sheet P allows the liquid to be applied to the liquid application position on the sheet P. When liquid application to the liquid application position is completed, the electric cylinder 370 is extended to separate the upper crimping teeth 32*a* and the upper pressure plate 34 from the sheet P. The above-described contact and separation operation (liquid application operation) of the upper crimping teeth 32*a* and the upper pressure plate 34 with respect to the sheets P is repeatedly performed on sheets P of the sheet bundle Pb.

When the sheet bundle Pb including a predetermined number of sheets P is placed on the internal tray 22, the electric cylinder 370 is further contracted to move the upper crimping teeth 32*a* toward the lower crimping teeth 32*b*. Then, as illustrated in FIG. 9C, in a state in which the sheet bundle Pb is sandwiched between the upper crimping teeth 32*a* and the lower crimping teeth 32*b*, the upper crimping teeth 32*a* further moves toward the lower crimping teeth 32*b*. Thus, the upper crimping teeth 32*a* and the lower crimping teeth 32*b* press and deform the sheet bundle Pb to crimp and bind the sheet bundle Pb (crimp binding operation).

Figure 10:
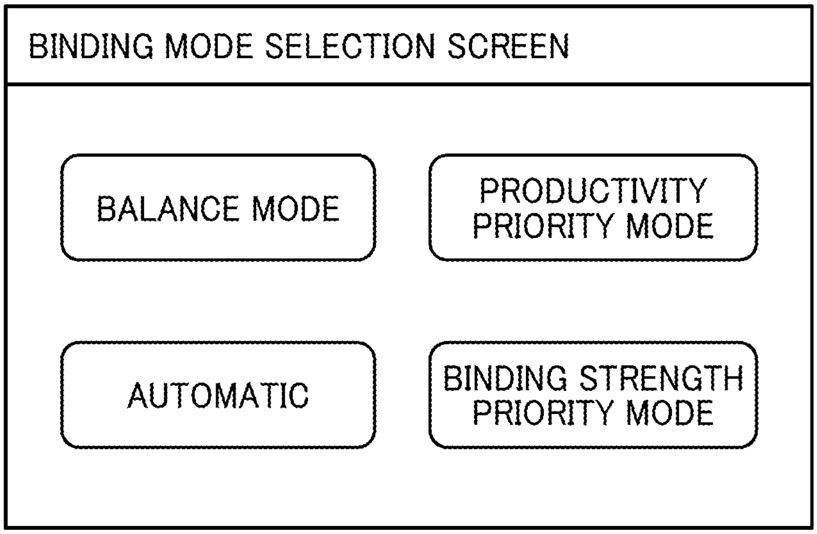
FIG. 10 is a display example of a binding mode selection screen displayed on a display.

FIG. 10 is a display example of a binding mode selection screen displayed on the display. The binding mode selection screen is displayed on the control panel 110 as an operation mode setting unit, and is a screen for allowing a user of the post-processing apparatus 3 to select a binding mode of a binding process which is described later.

The binding mode is for switching between the productivity (throughput) and the strength of the crimp binding in the case where a plurality of crimp binding positions are crimpled. In other words, the binding mode is for switching the moving method of the edge binder 25 in the crimp binding. The binding mode includes, for example, a binding strength priority mode ("first mode") and a productivity priority mode and a balance mode ("second mode").

The productivity priority mode is a mode in which the productivity is prioritized over the strength of the crimp binding. More specifically, the productivity priority mode is a binding mode in which the number of times of liquid application by the liquid applier 31 is smaller than that in the binding strength priority mode. The productivity priority mode is a binding mode in which the amount of movement of the edge binder 25 is smaller than that in the balance mode.

The binding strength priority mode is a mode in which the strength of crimp binding is prioritized over the productivity. Since the liquid application is prioritized, the binding strength priority mode corresponds to a "liquid application priority mode". More specifically, the binding strength priority mode is a binding mode in which the number of times of liquid application by the liquid applier 31 is increased as compared with the productivity priority mode and the balance mode.

The balance mode is a binding mode in which the productivity and the strength of crimp binding are balanced. More specifically, the balance mode is a binding mode in which the number of times of liquid application to a plurality of crimp binding positions is equalized to increase the strength of the crimp binding as compared to the productivity priority mode. The balance mode is also a binding mode in which the number of times of liquid application by the liquid applier 31 is decreased as compared to that in the binding strength priority mode, to increase the productivity as compared to the productivity in the binding strength priority mode.

As illustrated in FIG. 10, the binding mode selection screen includes a "productivity priority mode" button corresponding to the productivity priority mode, a "binding strength priority mode" button corresponding to the binding strength priority mode, a "balance mode" button corresponding to the balance mode, and an "automatic" button. The "automatic" button corresponds to the controller 100 determining the binding mode based on the conditions of executing the binding (for example, the number N of the sheets P constituting the sheet bundle Pb and the liquid absorbency of the sheets P).

The user of the post-processing apparatus 3 presses (performs an input operation on) a button corresponding to a desired binding mode among the plurality of buttons included in the binding mode selection screen. The controller 100 switches to the binding mode corresponding to the pressed button (input operation through the operation unit). The binding modes are not limited to the three modes of the productivity priority mode, the binding strength priority mode, and the balance mode. For example, any one of the three modes may be omitted.

Figure 11:
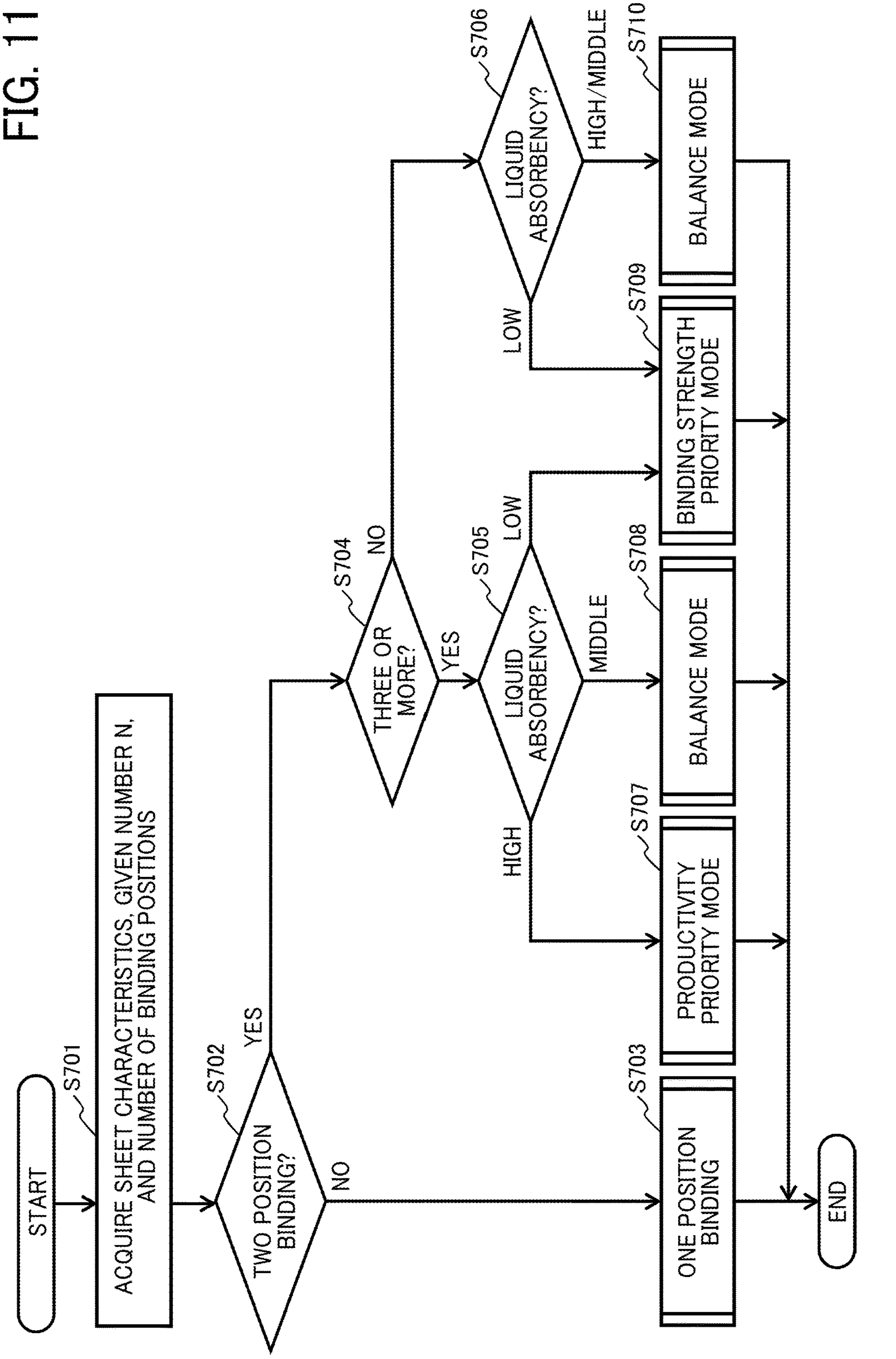
FIG. 11 is a flowchart of a binding process.

FIG. 11 is a flowchart of a binding process according to an embodiment of the present disclosure. The binding process illustrated in FIG. 11 is executed when the "automatic" button is selected on the binding mode selection screen. For example, the controller 100 executes the binding process in response to acquisition of an instruction to execute the binding process (hereinafter, referred to as a "binding instruction") from the image forming apparatus 2.

The controller 100 acquires execution conditions included in the binding instruction (step S701). The execution conditions include, for example, characteristics of the sheet P, the number of sheets P constituting a sheet bundle Pb (hereinafter referred to as a "given number N"), and the number of crimp binding positions. The characteristics of the sheet P are information directly or indirectly indicating the liquid absorbency of the sheet P, such as the type of the sheet P (plain paper, glossy paper, inkjet paper, or the like) and the thickness of the sheet P.

Subsequently, the controller 100 determines whether the number of crimp binding positions is two (step S702). When the controller 100 determines that the number of crimp binding positions is one (NO in step S702), the controller 100 executes one-point binding (step S703). The one-point binding refers to a process in which the sheet bundle Pb is crimped and bound at one place in the main scanning direction. Details of the one-point binding will be described later with reference to FIG. 12.

On the other hand, when the controller 100 determines that the number of crimp binding positions is two (YES in step S702), the controller 100 determines whether the given number N is three or more (step S704). The controller 100 also determines the liquid absorbency of the sheet P based on the characteristics of the sheet P (step S705 and step S706). The controller 100 switches the binding mode (step S707, step S708, step S709, and step S710) according to at least one of the value of the given number N of sheets and the liquid absorbency of media (step S704, step S705, and step S706). The liquid absorbency according to the present embodiment is classified into three levels: "high" which is equal to or greater than a first threshold value; "medium" which is less than the first threshold value and equal to or greater than a second threshold value; and "low" which is less than the second threshold value. However, the number of levels of liquid absorbency is not limited to three and may be any suitable number.

When the value of the given number N of sheets is three or more and the liquid absorbency is "high" (YES in step S704 and HIGH in step S705), the controller 100 executes the two-point binding in the producibility priority mode (step S707). The two-point binding refers to a process of crimping and binding the sheet bundle Pb at two positions in the main scanning direction. The two-point binding in the productivity priority mode will be described later with reference to FIGS. 15A to 15H.

When the value of the given number N of sheets is three or more and the liquid absorbency is "medium" (YES in step S704 and MEDIUM in step S705), the controller 100 executes two-point binding in the balance mode (step S708). Similarly, when the given number N of sheets is less than three and the liquid absorbency is "high" or "medium" (NO in step S704 and HIGH or MEDIUM in step S706), the controller 100 executes the two-point binding in the balance mode (step S710). The two-point binding in the balance mode will be described later with reference to FIGS. 14A to 14H.

When the value of the given number N of sheets is three or more and the liquid absorbency is "low" (YES in step S704 and LOW in step S705), the controller 100 executes the two-point binding in the binding strength priority mode (step S709). Similarly, when the given number N of sheets is less than three and the liquid absorbency is "low" (NO in step S704 and LOW in step S706), the controller 100 executes the two-point binding in the binding strength priority mode (step S709). The two-point binding in the binding strength priority mode will be described later with reference to FIGS. 13A to 13H.

On the other hand, when a button other than the "automatic" button is selected on the binding mode selection screen, a process corresponding to the binding mode selected by the user is executed instead of the processing of steps S704 to S710. In other words, when the "productivity priority mode" button is selected, the process of FIGS. 15A to 15H is executed, when the "binding strength priority mode" button is selected, the process of FIGS. 13A to 13H is executed, and when the "balance mode" button is selected, the process of FIGS. 14A to 14H is executed.

Figures 12A, 12B, 12C, 12D:
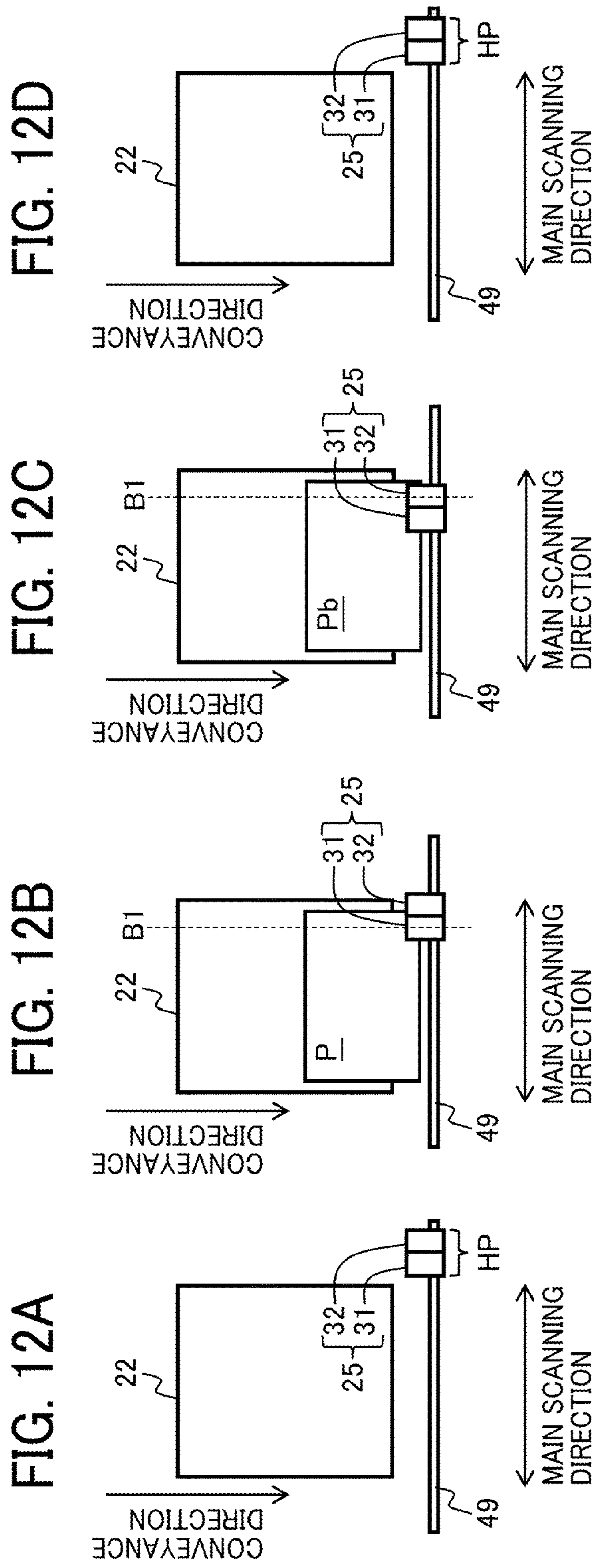
FIGS. 12A, 12B, 12C, and 12D are diagrams illustrating the positions of the edge binder during execution of one-point binding.

FIGS. 12A, 12B, 12C, and 12D are diagrams illustrating the positions of the edge binder 25 during execution of the one-point binding. As illustrated in FIG. 12A, it is assumed that the edge binder 25 is located at the standby position HP at the start point of the one-point binding. The standby position HP is away in the main scanning direction from the sheets P placed on the internal tray 22. In other words, the standby position HP is a position at which the edge binder 25 does not face the sheet P or the sheet bundle Pb placed on the internal tray 22.

First, before the sheet P is supplied to the internal tray 22, the controller 100 drives the edge binder movement motor 50 to move the edge binder 25 in the main scanning direction so that the liquid applier 31 can face the crimp binding position B1 indicated by the binding command.

Subsequently, the controller 100 rotates the conveyance roller pairs 10, 11, 14, and 15 in the state in which the liquid applier 31 is placed at a position at which the liquid applier 31 can face the crimp binding position B1 as illustrated in FIG. 12B, to place the sheet P, on which an image is formed by the image forming apparatus 2, onto the internal tray 22. The controller 100 moves the side fences 24L and 24R to align the position of the sheet bundle Pb placed on the internal tray 22 in the main scanning direction. In short, the controller 100 performs so-called jogging.

Subsequently, in response to the sheet P being placed on the internal tray 22 by the conveyance roller pairs 10, 11, 14, and 15, the controller 100 causes the liquid applier 31 to apply the liquid to the crimp binding position B1 of the sheet P. In other words, the controller 100 drives the liquid applier movement motor 37 to cause the liquid application member 44 to contact the crimp binding position B1 on the sheet P placed on the internal tray 22.

The controller 100 repeats the conveyance of the sheet P by the conveyance roller pairs 10, 11, 14, and 15 and the liquid application to the crimp binding position B1 by the liquid applier 31 until the number of sheets P placed on the internal tray 22 reaches the given number N. Note that the liquid may be applied to some sheets P or all the sheets P of the sheet bundle Pb. For example, the controller 100 may cause the liquid applier 31 to apply the liquid to the binding position B1 of the sheet P one in every "A" sheets. Note that "A" is less than "N" (i.e., A<N).

Subsequently, when the controller 100 determines that the number of sheets P that are placed on the internal tray 22 has reached the given number N, the controller 100 drives the edge binder movement motor 50 to cause the edge binder 25 to move in the main scanning direction so that the crimper 32 faces the crimp binding position B1 as illustrated in FIG. 12C.

Subsequently, the controller 100 crimps and binds the sheet bundle Pb placed on the internal tray 22 and outputs the sheet bundle Pb to the output tray 26. Specifically, the controller 100 drives the contact-separation motor 32*d* to cause the pair of binding teeth 32*a* and 32*b* to sandwich the crimp binding position B1 on the sheet bundle Pb placed on the internal tray 22. The controller 100 then rotates the conveyance roller pair 15 to output the sheet bundle Pb thus crimped and bound to the output tray 26. Further, as illustrated in FIG. 12D, the controller 100 drives the edge binder movement motor 50 to move the edge binder 25 to the standby position HP.

That is, the controller 100 drives the conveyance roller pairs 10, 11, 14, and 15 in a state in which the liquid applier 31 is placed at a position at which the liquid applier 31 can face the crimp binding position B1, to sequentially convey the plurality of sheets P of the sheet bundle Pb toward the internal tray 22. The controller 100 also causes the liquid applier 31 to apply the liquid to the crimp binding position of at least one sheet P conveyed to the internal tray 22 by the conveyance roller pairs 10, 11, 14, and 15. When a given number N of sheets P are placed on the internal tray 22, the controller 100 causes the crimper 32 to crimp and bind the sheets P at the crimp binding position B1.

Figures 13A, 13B, 13C, 13D, 13E, 13F, 13G, 13H:
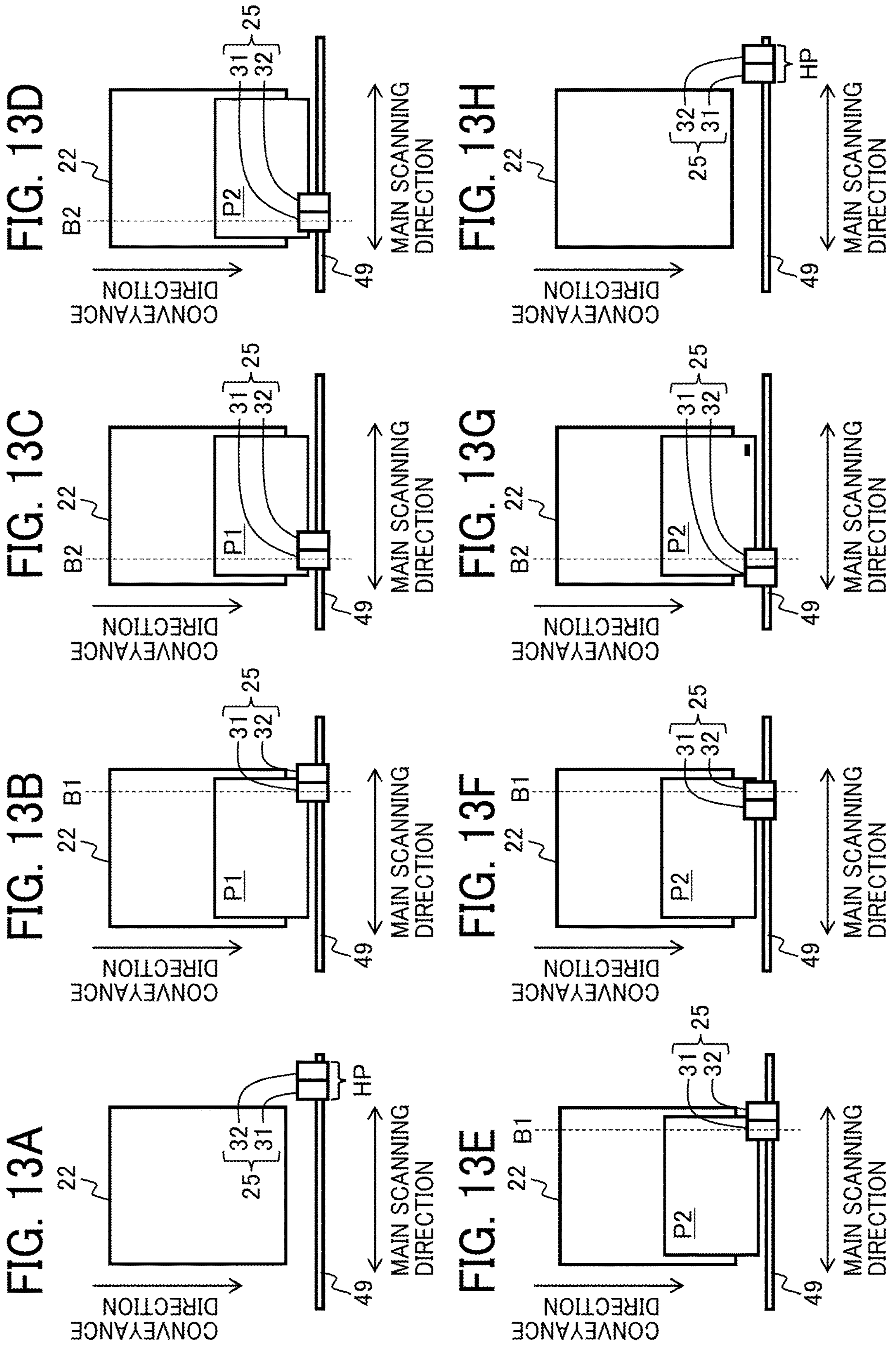
FIGS. 13A, 13B, 13C, 13D, 13E, 13F, 13G, and 13H are diagrams illustrating the positions of the edge binder during execution of two-point binding in a binding strength priority mode.

FIGS. 13A, 13B, 13C, 13D, 13E, 13F, 13G, and 13H are diagrams illustrating the positions of the edge binder 25 during execution of the two-point binding in the binding strength priority mode. A detailed description of points common to the process described with reference to FIGS. 12A to 13H may be omitted, and differences will be mainly described. As illustrated in FIG. 13A, it is assumed that the edge binder 25 is placed at the standby position HP at the start point of the two-point binding in the binding strength priority mode. The first crimp binding position B1 and the second crimp binding position B2 are apart from each other in the main scanning direction. In FIGS. 13A to 13H, the case where two sheets P are crimped and bound (that is, N=2) will be described. However, the number of sheets P of the sheet bundle Pb is not limited to two.

Before a first sheet P1 of the sheet bundle Pb is supplied to the internal tray 22, the controller 100 moves the edge binder 25 in the main scanning direction so that the liquid applier 31 can face the first crimp binding position B1. Subsequently, as illustrated in FIG. 13B, the controller 100 places the sheet P1, on which an image has been formed by the image forming apparatus 2, on the internal tray 22 and jogs the sheet P1 in a state in which the liquid applier 31 is disposed at a position at which the liquid applier 31 can face the first crimp binding position B1.

Subsequently, in response to the sheet P1 being placed on the internal tray 22, the controller 100 causes the liquid applier 31 to apply the liquid to the first crimp binding position B1 of the sheet P1. Subsequently, as illustrated in FIG. 13C, the controller 100 causes the edge binder 25 to move in the main scanning direction so that the liquid applier 31 faces the second crimp binding position B2 of the sheet P1. Subsequently, the controller 100 causes the liquid applier 31 to apply the liquid to the second crimp binding position B2 of the sheet P1.

Subsequently, as illustrated in FIG. 13D, in response to the liquid being applied to the first crimp binding position B1 and the second crimp binding position B2 of the sheet P1, the controller 100 places a second sheet P2 of the sheet bundle Pb on the internal tray 22 and jogs the sheet P2 in a state in which the liquid applier 31 is disposed at a position at which the liquid applier 31 can face the second crimp binding position B2.

Subsequently, in response to the sheet P2 being placed on the internal tray 22, the controller 100 causes the liquid applier 31 to apply the liquid to the second crimp binding position B2 of the sheet P2. Subsequently, as illustrated in FIG. 13E, the controller 100 causes the edge binder 25 to move in the main scanning direction so that the liquid applier 31 faces the first crimp binding position B1 of the sheet P2. Subsequently, the controller 100 causes the liquid applier 31 to apply the liquid to the first crimp binding position B1 of the sheet P2.

That is, the controller 100 repeats the conveyance of the sheet P by the conveyance roller pairs 10, 11, 14, and 15 and the liquid application to the first crimp binding position B1 and the second crimp binding position B22 by the liquid applier 31 until the number of sheets P placed on the internal tray 22 reaches the given number N. At this time, the controller 100 causes the liquid applier 31 to apply the liquid to the B-th sheet P (B<N) in the order of the first crimp binding position B1 and the second crimp binding position B2. The controller 100 also causes the liquid applier 31 to apply the liquid to the (B+1)-th sheet P in the order of the second crimp binding position B2 and the first crimp binding position B1. In other words, the controller 100 changes the order in which the liquid applier 31 applies the liquid to the first crimp binding position B1 and the second crimp binding position B2 for each sheet P. The controller 100 also causes the edge binder 25 to move from one of the first crimp binding position B1 and the second crimp binding position B2 to the other of the first crimp binding position B1 and the second crimp binding position B2 in the shortest distance without passing through the standby position HP.

Subsequently, when the controller 100 determines that the number of sheets P placed on the internal tray 22 has reached the given number N, the controller 100 causes the crimper 32 to face the first crimp binding position B1 as illustrated in FIG. 13F. Subsequently, the controller 100 crimps and binds the first crimp binding position B1 of the sheet bundle Pb placed on the internal tray 22. Subsequently, as illustrated in FIG. 13G, the controller 100 causes the crimper 32 to face the second crimp binding position B2. Subsequently, the controller 100 crimps and binds the second crimp binding position B2 of the sheet bundle Pb placed on the internal tray 22.

In the example illustrated in FIGS. 13A to 13H, since the liquid is finally applied to the first crimp binding position B1, the crimp binding is performed in the order of the first crimp binding position B1 and the second crimp binding position B2. On the other hand, when the liquid is finally applied to the second crimp binding position B2, the crimp binding is performed in the order of the second crimp binding position B2 and the first crimp binding position B1.

Subsequently, the controller 100 outputs the sheet bundle Pb crimped and bound at the first crimp binding position B1 and the second crimp binding position B2 to the output tray 26. Further, as illustrated in FIG. 13H, the controller 100 causes the edge binder 25 to move to the standby position HP.

Figures 14A, 14B, 14C, 14D, 14E, 14F, 14G, 14H:
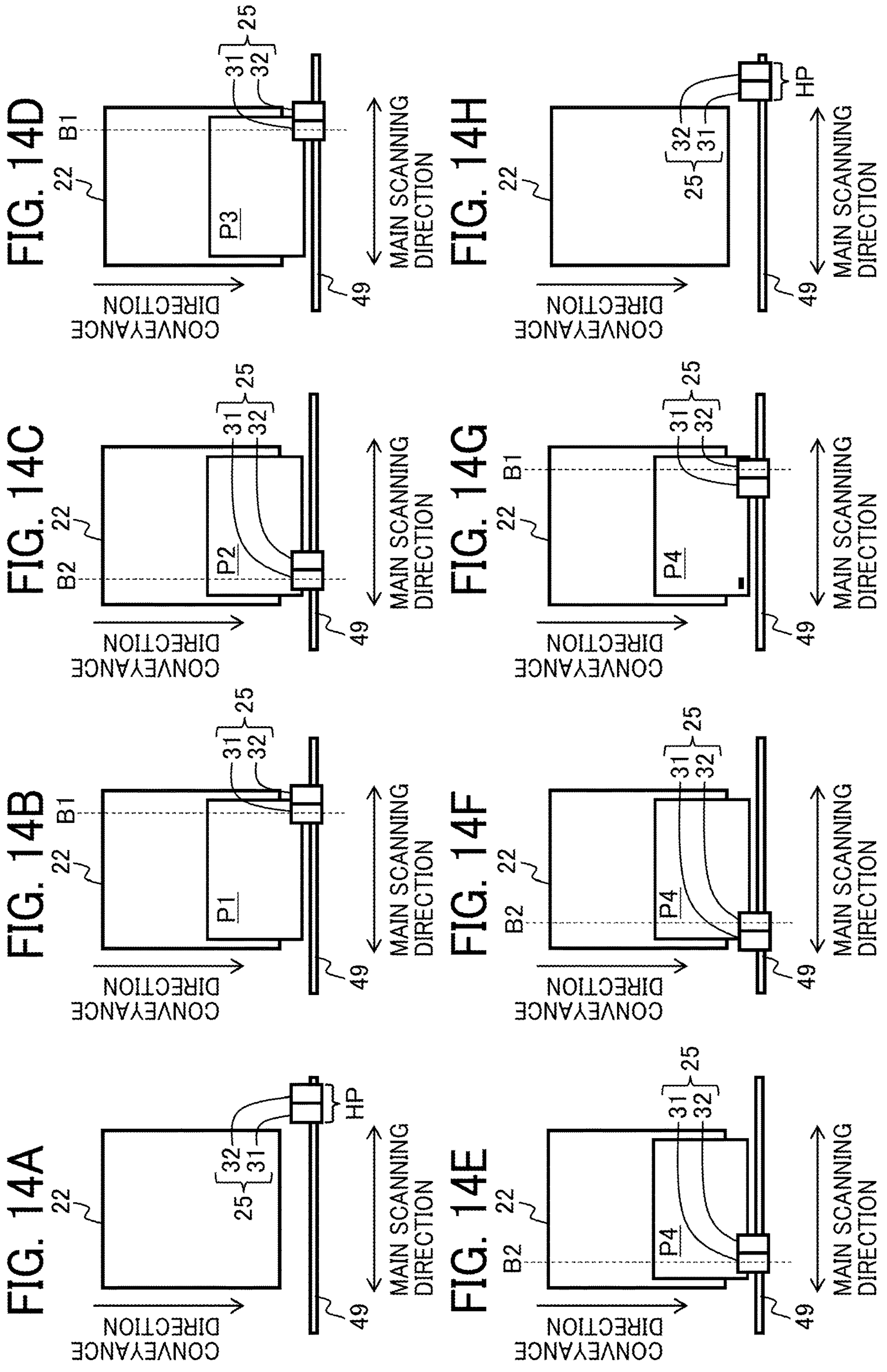
FIGS. 14A, 14B, 14C, 14D, 14E, 14F, 14G, and 14H are diagrams illustrating the positions of the edge binder during execution of two-point binding in a balance mode.

FIGS. 14A, 14B, 14C, 14D, 14E, 14F, 14G, and 14H are diagrams illustrating the positions of the edge binder 25 during execution of the two-point binding in the balance mode. A detailed description of points common to the processing described with reference to FIGS. 12A to 12D and FIGS. 13A to 13H may be omitted, and differences will be mainly described. As illustrated in FIG. 14A, it is assumed that the edge binder 25 is positioned at the standby position HP at the start point of the two-point binding in the balance mode. In FIGS. 14A to 14H, the case where four sheets P are crimped and bound (that is, N=4) will be described. However, the number of sheets P of the sheet bundle Pb is not limited to four.

Before a first sheet P1 of the sheet bundle Pb is supplied to the internal tray 22, the controller 100 moves the edge binder 25 in the main scanning direction so that the liquid applier 31 can face the first crimp binding position B1. Subsequently, as illustrated in FIG. 14B, the controller 100 places the sheet P1, on which an image has been formed by the image forming apparatus 2, on the internal tray 22 and jogs the sheet P1 in a state in which the liquid applier 31 is disposed at a position at which the liquid applier 31 can face the first crimp binding position B1.

Subsequently, in response to the sheet P1 being placed on the internal tray 22, the controller 100 causes the liquid applier 31 to apply the liquid to the first crimp binding position B1 of the sheet P1. Subsequently, the controller 100 causes the edge binder 25 to move in the main scanning direction so that the liquid applier 31 faces the second crimp binding position B2 of the sheet P1. However, the controller 100 does not cause the liquid applier 31 to apply liquid to the second crimp binding position B2 of the sheet P1.

Subsequently, as illustrated in FIG. 14C, the controller 100 places a second sheet P2 of the sheet bundle Pb on the internal tray 22 and jogs the sheet P2 in a state in which the liquid applier 31 is disposed at a position at which the liquid applier 31 can face the second crimp binding position B2. Subsequently, in response to the sheet P2 being placed on the internal tray 22, the controller 100 causes the liquid applier 31 to apply the liquid to the second crimp binding position B2 of the sheet P2. Subsequently, the controller 100 causes the edge binder 25 to move in the main scanning direction so that the liquid applier 31 faces the first crimp binding position B1 of the sheet P2. However, the controller 100 does not cause the liquid applier 31 to apply liquid to the first crimp binding position B1 of the sheet P2.

Similarly, as illustrated in FIG. 14D, the controller 100 places a third sheet P3 on the internal tray 22 in a state in which the liquid applier 31 is disposed at a position at which the liquid applier 31 can face the first crimp binding position B1, and causes the liquid applier 31 to apply the liquid to the first crimp binding position B1 of the sheet P3. In addition, as illustrated in FIG. 14E, the controller 100 places a fourth sheet P4 on the internal tray 22 in a state in which the liquid applier 31 is disposed at a position at which the liquid applier 31 can face the second crimp binding position B2, and causes the liquid applier 31 to apply the liquid to the second crimp binding position B2 of the sheet P4.

That is, the controller 100 repeats the conveyance of the sheet P by the conveyance roller pairs 10, 11, 14, and 15 and the liquid application to the first crimp binding position B1 and the second crimp binding position B2 by the liquid applier 31 until the number of sheets P placed on the internal tray 22 reaches the given number N. At this time, the controller 100 causes the liquid applier 31 to apply the liquid only to the first crimp binding position B1 of the C-th sheet P (C<N). In addition, the controller 100 causes the liquid applier 31 to apply the liquid only to the second crimp binding position B2 of the (C+1)-th sheet P. The controller 100 also causes the edge binder 25 to move from one of the first crimp binding position B1 and the second crimp binding position B2 to the other of the first crimp binding position B1 and the second crimp binding position B2 in the shortest distance without passing through the standby position HP.

Subsequently, when the controller 100 determines that the number of sheets P placed on the internal tray 22 has reached the given number N, the controller 100 causes the crimper 32 to face the second crimp binding position B2 as illustrated in FIG. 14F. Subsequently, the controller 100 crimps and binds the second crimp binding position B2 of the sheet bundle Pb placed on the internal tray 22. Subsequently, as illustrated in FIG. 14G, the controller 100 causes the crimper 32 to face the first crimp binding position B1. Subsequently, the controller 100 crimps and binds the first crimp binding position B1 of the sheet bundle Pb placed on the internal tray 22.

In the example of FIGS. 14A to 14H, since the liquid is finally applied to the second crimp binding position B2, the crimp binding is performed in the order of the second crimp binding position B2 and the first crimp binding position B1. On the other hand, when the liquid is finally applied to the first crimp binding position B1, the crimp binding is performed in the order of the first crimp binding position B1 and the second crimp binding position B2.

Subsequently, the controller 100 outputs the sheet bundle Pb crimped and bound at the first crimp binding position B1 and the second crimp binding position B2 to the output tray 26. Further, as illustrated in FIG. 14H, the controller 100 causes the edge binder 25 to move to the standby position HP.

Figures 15A, 15B, 15C, 15D, 15E, 15F, 15G, 15H:
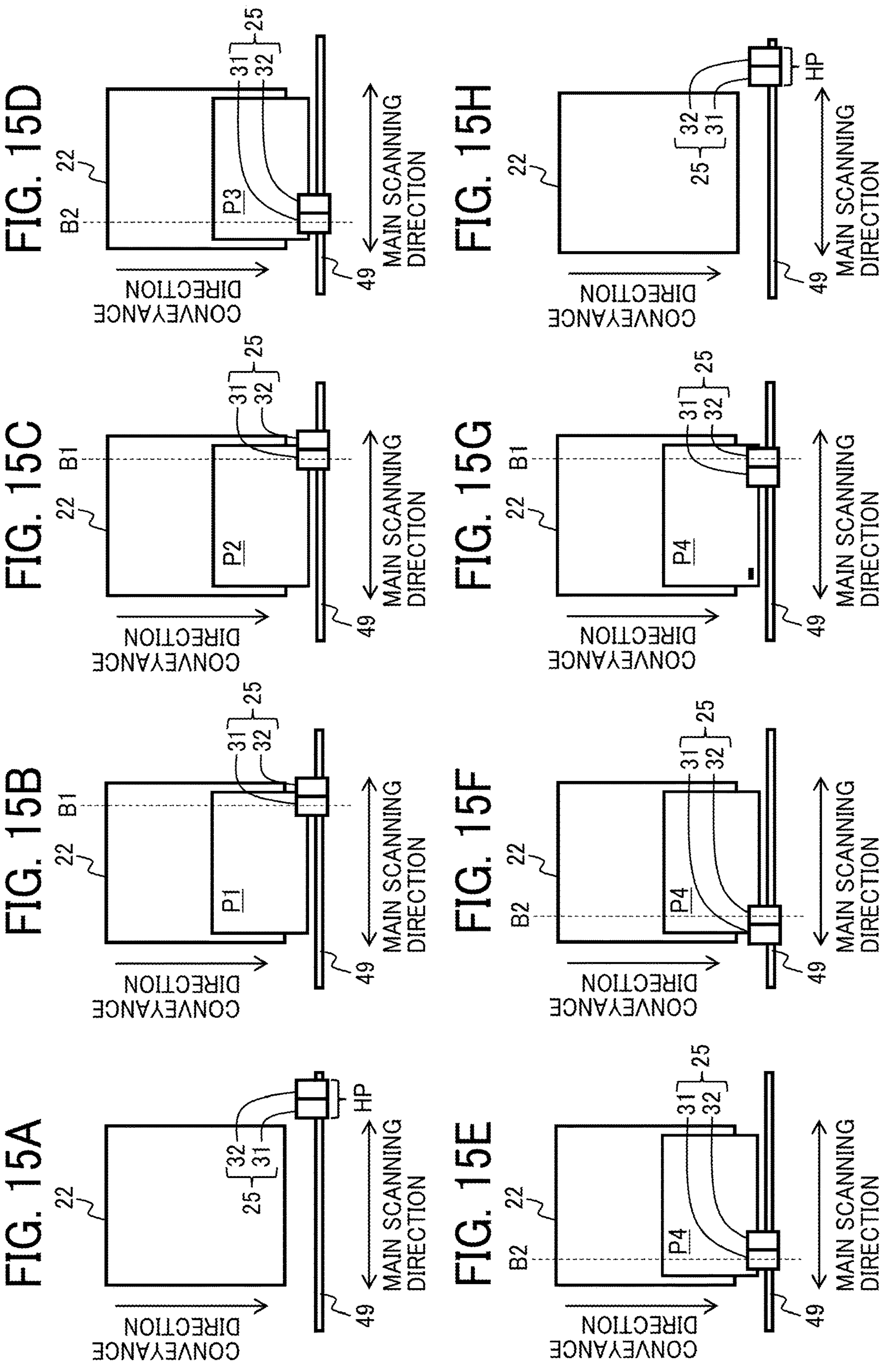
FIGS. 15A, 15B, 15C, 15D, 15E, 15F, 15G, and 15H are diagrams illustrating the positions of the edge binder during execution of two-point binding in a productivity priority mode.

FIGS. 15A, 15B, 15C, 15D, 15E, 15F, 15G, and 15H are diagrams illustrating the positions of the edge binder 25 during execution of the two-point binding in the productivity priority mode. A detailed description of points common to the process described with reference to FIGS. 12A to 14H may be omitted, and differences will be mainly described. As illustrated in FIG. 15A, it is assumed that the edge binder 25 is placed at the standby position HP at the start point of the two-point binding in the productivity priority mode. In FIGS. 15A to 15H, the case where four sheets P are crimped and bound (that is, N=4) will be described. However, the number of sheets P of the sheet bundle Pb is not limited to four.

Before a first sheet P1 of the sheet bundle Pb is supplied to the internal tray 22, the controller 100 moves the edge binder 25 in the main scanning direction so that the liquid applier 31 can face the first crimp binding position B1. Subsequently, as illustrated in FIG. 15B, the controller 100 places the sheet P1, on which an image has been formed by the image forming apparatus 2, on the internal tray 22 and jogs the sheet P1 in a state in which the liquid applier 31 is disposed at a position at which the liquid applier 31 can face the first crimp binding position B1. Subsequently, in response to the sheet P1 being placed on the internal tray 22, the controller 100 causes the liquid applier 31 to apply the liquid to the first crimp binding position B1 of the sheet P1.

Subsequently, as illustrated in FIG. 15C, the controller 100 places a second sheet P2 of the sheet bundle Pb on the internal tray 22 and jogs the sheet P2 in a state in which the liquid applier 31 is disposed at a position at which the liquid applier 31 can face the first crimp binding position B1. Subsequently, in response to the sheet P2 being placed on the internal tray 22, the controller 100 causes the liquid applier 31 to apply the liquid to the first crimp binding position B1 of the sheet P2. As described above, from when the first sheet P1 is placed on the internal tray 22 to when the second sheet P2 is placed on the internal tray 22, the liquid applier 31 remains still while facing the first crimp binding position B1.

Subsequently, the controller 100 causes the edge binder 25 to move in the main scanning direction so that the liquid applier 31 faces the second crimp binding position B2 of the sheet P2. Subsequently, as illustrated in FIG. 15D, the controller 100 places a third sheet P3 of the sheet bundle Pb on the internal tray 22 and jogs the sheet P3 in a state in which the liquid applier 31 is disposed at a position at which the liquid applier 31 can face the second crimp binding position B2. Subsequently, in response to the sheet P3 being placed on the internal tray 22, the controller 100 causes the liquid applier 31 to apply the liquid to the second crimp binding position B2 of the sheet P3.

Subsequently, as illustrated in FIG. 15E, the controller 100 places a fourth sheet P4 of the sheet bundle Pb on the internal tray 22 and jogs the sheet P4 in a state in which the liquid applier 31 is disposed at a position at which the liquid applier 31 can face the second crimp binding position B2. Subsequently, in response to the sheet P4 being placed on the internal tray 22, the controller 100 causes the liquid applier 31 to apply the liquid to the second crimp binding position B2 of the sheet P4. As described above, from when the third sheet P3 is placed on the internal tray 22 to when the fourth sheet P4 is placed on the internal tray 22, the liquid applier 31 remains still while facing the first crimp binding position B1.

That is, the controller 100 repeats the conveyance of the sheet P by the conveyance roller pairs 10, 11, 14, and 15 and the liquid application to the first crimp binding position B1 and the second crimp binding position B2 by the liquid applier 31 until the number of sheets P placed on the internal tray 22 reaches the given number N. At this time, the controller 100 causes the liquid applier 31 to apply the liquid only to the first crimp binding position B1 of the (D+1)-th sheet P (D<N−3). In addition, the controller 100 causes the liquid applier 31 to apply the liquid only to the second crimp binding positions B2 of the (D+2)-th sheet P and the (D+3)-th sheet P. The controller 100 also causes the edge binder 25 to move from one of the first crimp binding position B1 and the second crimp binding position B2 to the other of the first crimp binding position B1 and the second crimp binding position B2 in the shortest distance without passing through the standby position HP.

Subsequently, when the controller 100 determines that the number of sheets P placed on the internal tray 22 has reached the given number N, the controller 100 causes the crimper 32 to face the second crimp binding position B2 as illustrated in FIG. 15F. Subsequently, the controller 100 crimps and binds the second crimp binding position B2 of the sheet bundle Pb placed on the internal tray 22. Subsequently, as illustrated in FIG. 15G, the controller 100 causes the crimper 32 to face the first crimp binding position B1. Subsequently, the controller 100 crimps and binds the first crimp binding position B1 of the sheet bundle Pb placed on the internal tray 22.

In the example of FIGS. 15A to 15H, since the liquid is finally applied to the second crimp binding position B2, the crimp binding is performed in the order of the second crimp binding position B2 and the first crimp binding position B1. On the other hand, when the liquid is finally applied to the first crimp binding position B1, the crimp binding is performed in the order of the first crimp binding position B1 and the second crimp binding position B2.

Subsequently, the controller 100 outputs the sheet bundle Pb crimped and bound at the first crimp binding position B1 and the second crimp binding position B2 to the output tray 26. Further, as illustrated in FIG. 15H, the controller 100 causes the edge binder 25 to move to the standby position HP.

That is, as illustrated in FIGS. 12A to 15H, the edge binder 25 (more specifically, the liquid applier 31) does not move to the standby position HP until the liquid application to the plurality of sheets P is completed, and moves to the standby position HP after the liquid application to the plurality of sheets P is completed.

In the related art, a medium processing apparatus repeats a process of conveying a medium to a tray in a state in which a hydration unit stands by at a standby position deviated in a width direction of the medium, moving the hydration unit to a binding position, and adding water. However, when the hydration unit reciprocates between the standby position and the binding position every time the medium is conveyed, the productivity of the crimp binding process may decrease.

According to the above-described embodiment, the following operational effects, for example, can be achieved.

According to the above-described embodiment, the conveyance roller pairs 10, 11, 14, and 15 are driven in a state in which the liquid applier 31 is disposed at a position at which the liquid applier 31 can face one of the first crimp binding position B1 and the second crimp binding position B2, to sequentially convey the plurality of sheets P toward the internal tray 22. Accordingly, the amount of movement of the edge binder 25 can be reduced as compared with the case where the edge binder 25 is moved among the standby position HP, the first crimp binding position B1, and the second crimp binding position B2 every time the sheet P is supplied to the internal tray 22. Thus, the productivity of the crimp binding can be enhanced.

In addition, according to the above-described embodiment, the liquid is applied to the sheet P at an interval of one sheet per A sheets, among the N sheets P sequentially supplied to the internal tray 22. Thus, the productivity of the crimp binding is further enhanced as compared to the case where the liquid is applied to all the sheets P.

Further, according to the above-described embodiment, the liquid is applied to only one of the first crimp binding position B1 and the second crimp binding position B2 of the sheet P. Thus, the time required for applying the liquid can be reduced as compared to the case where the liquid is applied to both the first crimp binding position B1 and the second crimp binding position B2 for all the sheets P. In particular, as illustrated in FIGS. 15A to 15H, the position to which the liquid is applied is changed every two sheets P. Thus, the amount of movement of the edge binder 25 can be reduced. As a result, the productivity of the crimp binding is further enhanced.

Further, according to the above-described embodiment, the binding mode is switched in accordance with the liquid absorbency of the sheet P. Such a configuration can reduce variations in the crimping force caused by the liquid absorbency of the sheet P and maintain the binding strength of the sheet bundle Pb.

According to the above-described embodiment, the binding mode is switched in accordance with the number N of sheets P of the sheet bundle Pb. More specifically, when the number of sheets P of the sheet bundle Pb is two, the productivity priority mode is not selected. Such a configuration can prevent the liquid from not being applied to the second crimp binding position B2 at all.

Further, according to the above-described embodiment, the binding mode is switched in response to an instruction from the user through the control panel 110. Thus, when the crimp binding is not appropriately performed in the binding mode selected by the controller 100, the user can select an appropriate binding mode.

Although an example in which one or two positions of the sheet bundle Pb are crimped and bound has been described in the above-described embodiment, an embodiment of the present disclosure is also applicable to a case in which three or more positions of the sheet bundle Pb spaced apart from each other in the main scanning direction are crimped and bound. In this case, the controller 100 causes the liquid applier 31 to apply the liquid to three or more crimp binding positions and causes the crimper 32 to perform the crimp binding. According to an embodiment of the present disclosure, the productivity of the crimp binding can be enhanced even when three or more positions are crimped and bound.

However, it is not necessary to apply the liquid to all the crimp binding positions of all the sheets P of the sheet bundle Pb. For example, when crimp binding is performed at three crimp binding positions apart from each other in the main scanning direction, the controller 100 may cause the liquid applier 31 to apply the liquid to three crimp binding positions of an E-th sheet P1 ($E<N-2$), apply the liquid to two crimp binding positions of an ($E+1$)-th sheet P2, and apply the liquid to one crimp binding position of an ($E+2$)-th sheet P2.

Now, a description is given of a second embodiment of the present disclosure.

Next, with reference to FIGS. 16 to 24, a description is given of a post-processing apparatus 3A according to the second embodiment of the present disclosure. In the following description, components like those of the first embodiment are denoted by like reference numerals, and redundant descriptions thereof may be omitted.

The post-processing apparatus 3A according to the second embodiment is different from the post-processing apparatus 3 according to the first embodiment in which the liquid applier 31 and the crimper 32 are arranged side by side. In the post-processing apparatus 3A according to the second embodiment, a liquid applier 131 is disposed alone at an upstream position in a direction in which the sheet P is conveyed. Such a configuration allows a given number of sheets P to be stacked after the liquid is applied and conveyed to the crimper 32 of the edge binder 25 disposed at a downstream position in the direction in which the sheet P is conveyed. Accordingly, the productivity of the binding process performed by the crimper 32 is enhanced.

Since the direction in which the conveyance roller pairs 10, 11, and 14 convey the sheet P is opposite to the "conveyance direction" defined above, the direction in which the conveyance roller pairs 10, 11, and 14 convey the sheet P is defined as an "reverse conveyance direction" in the following description. A direction that is orthogonal to the reverse conveyance direction and the thickness direction of the sheet P is defined as "main scanning direction."

Figure 16:
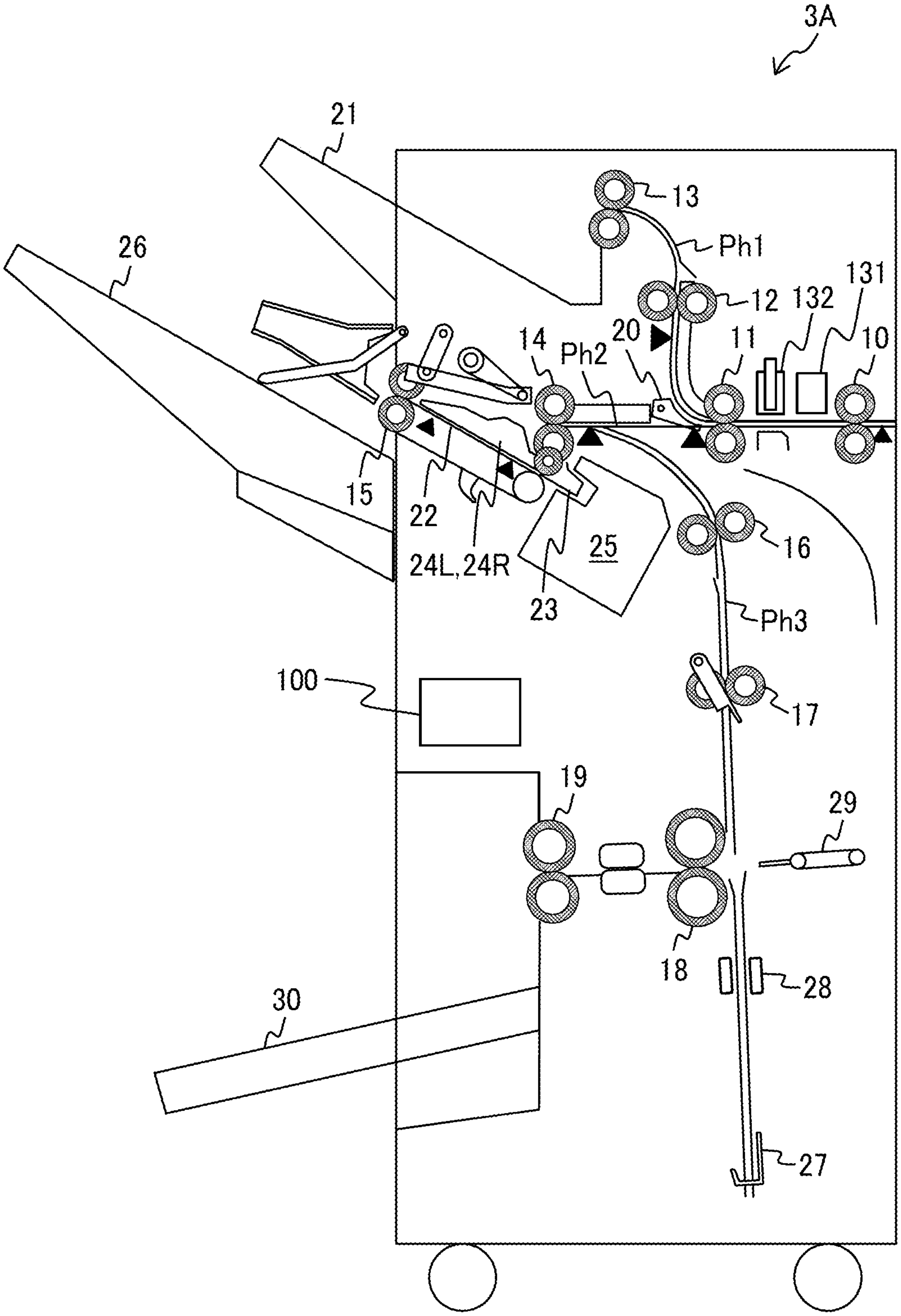
FIG. 16 is a diagram illustrating an internal configuration of a post-processing apparatus according to a second embodiment of the present disclosure.
Figure 17A:
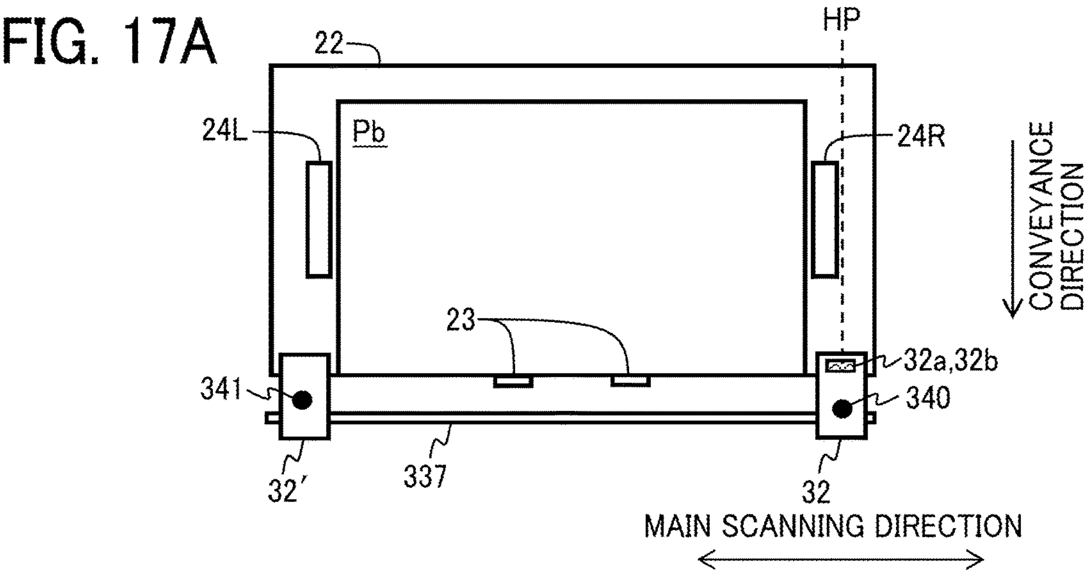
FIGS. 17A, 17B, and 17C are views of an internal tray of the post-processing apparatus of FIG. 16 in a thickness direction of a sheet.
Figure 17B:
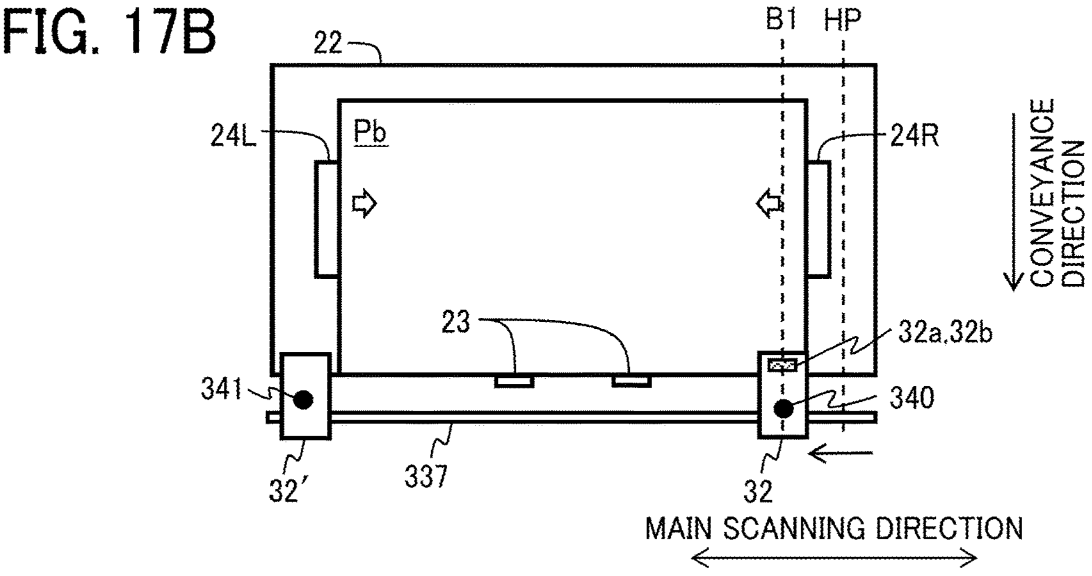
Figure 17C:
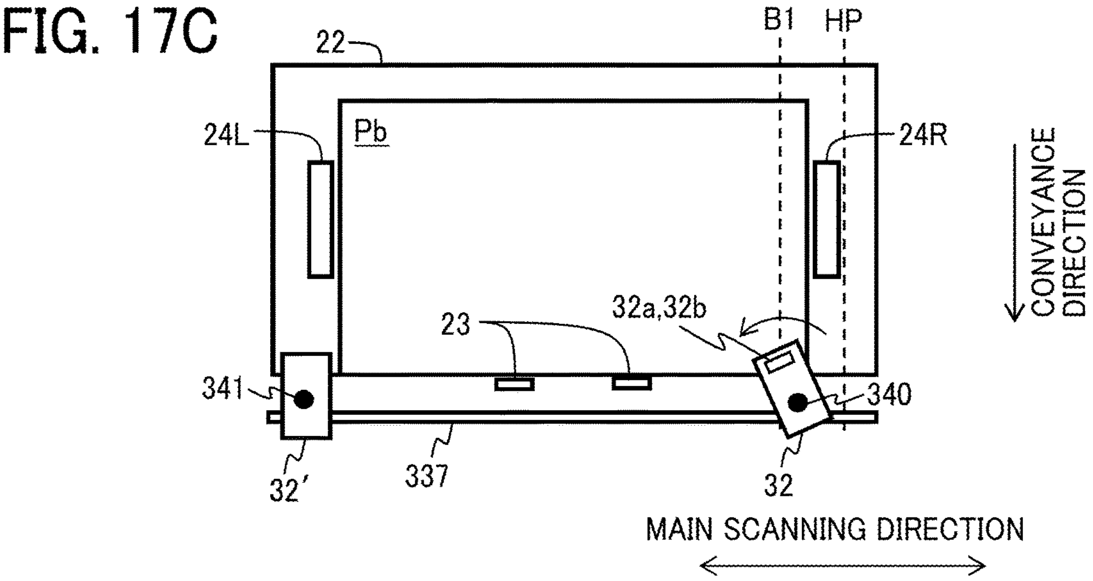

FIG. 16 is a diagram illustrating an internal configuration of the post-processing apparatus 3A according to the second embodiment of the present disclosure. As illustrated in FIG. 17, the edge binder 25 includes a crimper 32 and a stapler 32'. As illustrated in FIGS. 17A to 17C, the crimper 32 and the stapler 32' are disposed downstream from the internal tray 22 in the conveyance direction. In addition, the crimper 32 and the stapler 32' are located to face a downstream end, in the conveyance direction, of the sheet bundle Pb placed on the internal tray 22 and move in the main scanning direction. Further, the crimper 32 and the stapler 32' are pivoted about an axis extending in the thickness direction of the sheet bundle Pb placed on the internal tray 22. In other words, the crimper 32 and the stapler 32' bind, at a desired angle, a desired position in the main scanning direction on the sheet bundle Pb placed on the internal tray 22 in, for example, corner oblique binding, parallel one-point binding, or parallel two-point binding.

The crimper 32 presses and deforms the sheet bundle Pb with serrate binding teeth 32*a* and 32*b* to bind the sheet bundle Pb. In the following description, such a binding way may be referred to as "crimp binding." In other words, the crimper 32 crimps and binds the sheet bundle Pb or performs the crimp binding on the sheet bundle Pb. On the other hand, the stapler 32' passes the staple through a crimp binding position on the sheet bundle Pb placed on the internal tray 22 to staple the sheet bundle Pb.

Figure 18:
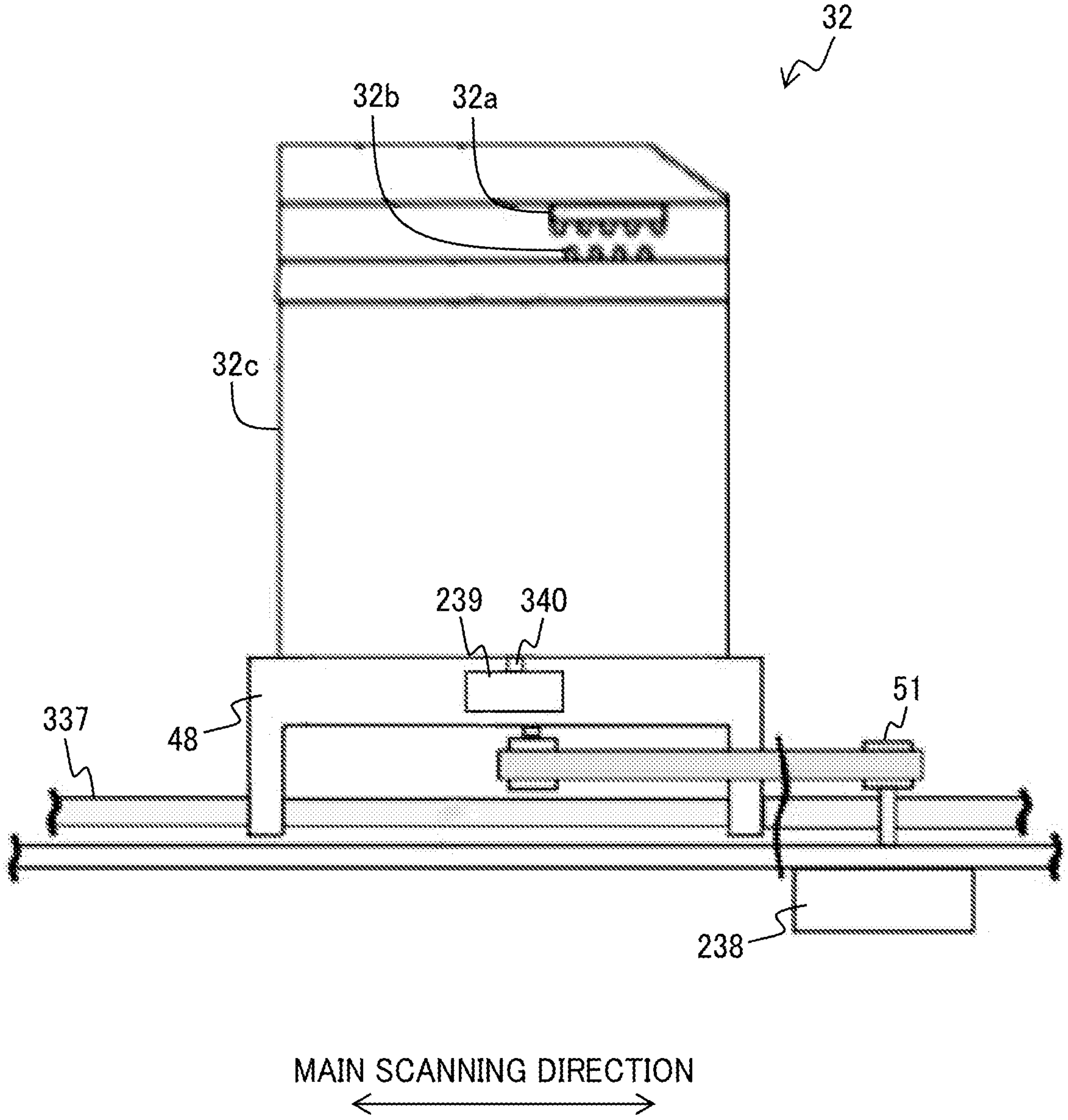
FIG. 18 is a schematic view of an upstream side of a crimper of the post-processing apparatus of FIG. 16 in a conveyance direction.

Each of FIGS. 17A to 17C is a view of the internal tray 22 in the thickness direction of the sheet bundle Pb. FIG. 18 is a schematic view of an upstream side of the crimper 32 in the conveyance direction. As illustrated in FIGS. 17A to 17C, the crimper 32 and the stapler 32' are disposed downstream from the internal tray 22 in the conveyance direction. The crimper 32 moves in the main scanning direction along the surface of the sheet bundle Pb placed on the internal tray 22. The crimper 32 is also pivoted about a pivot 340 extending in the thickness direction of the sheet bundle Pb placed on the internal tray 22. Similarly, the stapler 32' moves in the main scanning direction of the sheet bundle Pb and is pivoted about a pivot 341 extending in the thickness direction of the sheet bundle Pb.

More specifically, as illustrated in FIG. 18, a guide rail 337 extending in the main scanning direction is disposed downstream from the internal tray 22 in the conveyance direction. The crimper 32 is moved in the main scanning direction along the surface of the sheet bundle Pb placed on the internal tray 22, in other words, along the guide rail 337, by a driving force transmitted from a crimper movement motor 238 by a driving force transmission assembly 51 including a pulley and a timing belt. The pivot 340 is fixed to a bottom face of the crimping frame 32*c* that holds the components of the crimper 32. The pivot 340 is rotatably held by the base 48 on which the crimping frame 32*c* is disposed. When a driving force is transmitted from a pivot motor 239 to the pivot 340, the crimper 32 is pivoted about the pivot 340 extending in the thickness direction of the sheet P placed on the internal tray 22. The guide rail 337, the crimper movement motor 238, the pivot motor 239, the pivot 340, and the driving force transmission assembly 51 construct a driving assembly of the crimper 32.

The crimper 32 moves between the standby position HP illustrated in FIG. 17A and a position where the crimper 32 faces the crimp binding position B1 illustrated in FIGS. 17B and 17C. The standby position HP is away in the main scanning direction from the sheet bundle Pb placed on the internal tray 22. For example, in FIGS. 17A to 17C, the standby position HP is distanced to the right of the sheet bundle Pb along the main scanning direction. The crimp binding position B1 is a position on the sheet bundle Pb placed on the internal tray 22. However, the specific position of the crimp binding position B1 is not limited to the position illustrated in FIGS. 17B and 17C. The binding position B1 may be one or more positions along the main scanning direction at the downstream end, in the conveyance direction, of the sheet P.

The posture of the crimper 32 changes or is pivoted between a parallel binding posture illustrated in FIG. 17B and an oblique binding posture illustrated in FIG. 17C. The parallel binding posture is a posture of the crimper 32 in which the length of the pair of binding teeth 32*a* and 32*b* (in other words, a rectangular crimp binding trace) is along the main scanning direction. The oblique binding posture is a posture of the crimper 32 in which the length of the pair of binding teeth 32*a* and 32*b* (in other words, the rectangular crimp binding trace) is inclined with respect to the main scanning direction.

The pivot angle, which is an angle of the pair of binding teeth 32*a* and 32*b* with respect to the main scanning direction, in the oblique binding posture is not limited to the angle illustrated in FIG. 17C. The pivot angle in the oblique binding posture may be any angle provided that the pair of binding teeth 32*a* and 32*b* faces the sheet bundle Pb placed on the internal tray 22.

Figure 24:
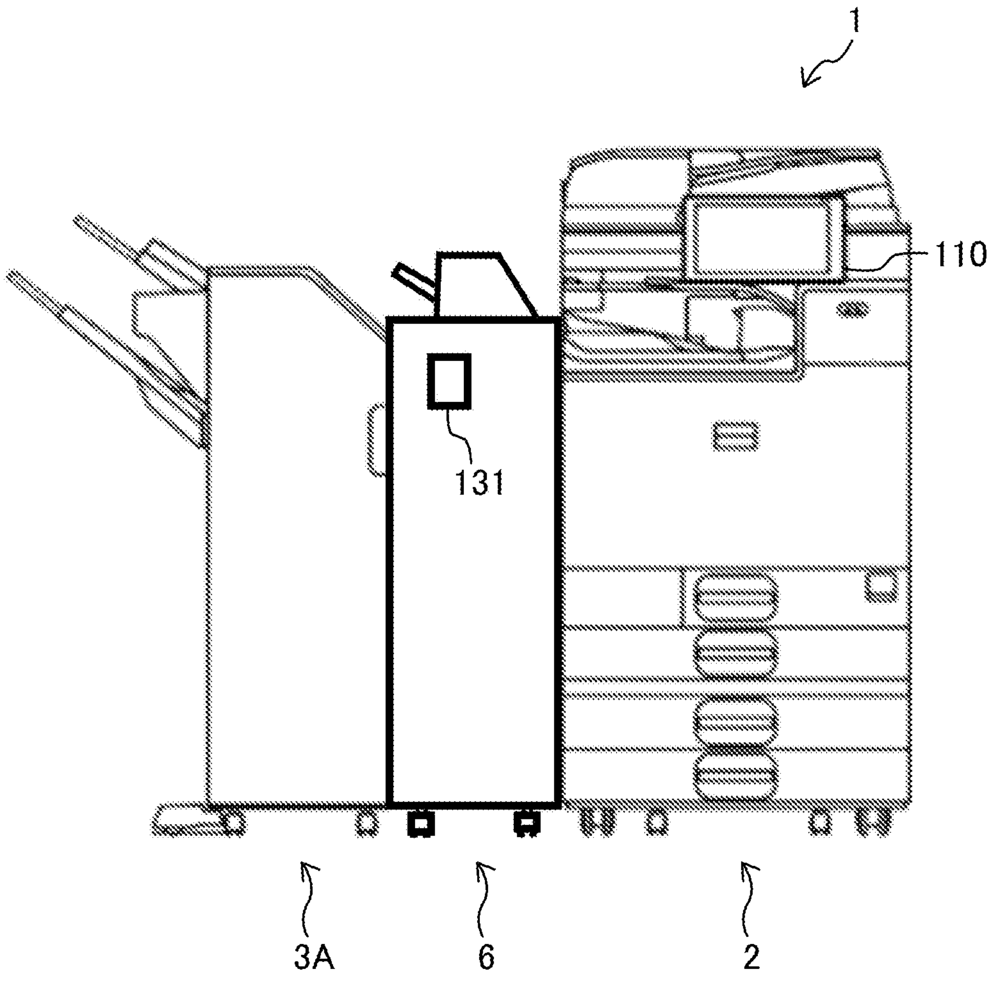
FIG. 24 is a diagram illustrating the overall configuration of an image forming system according to a modification of the embodiment illustrated in FIG. 1.

The post-processing apparatus 3A includes the liquid applier 131 and a hole punch 132 serving as a processor. The liquid applier 131 and the hole punch 132 are disposed upstream from the internal tray 22 in the opposite conveyance direction. In addition, the liquid applier 131 and the hole punch 132 are disposed at different positions in the opposite conveyance direction to simultaneously face one sheet P that is conveyed by the conveyance roller pairs 10 to 19. The liquid applier 131 and the hole punch 132 according to the present embodiment are disposed between the conveyance roller pairs 10 and 11. However, the arrangement of the liquid applier 131 and the hole punch 132 is not limited to the arrangement illustrated in FIG. 16. For example, in a case where an inserter 6 is disposed between the image forming apparatus 2 and the post-processing apparatus 3A as illustrated in FIG. 24, the liquid applier 131 may be disposed inside the inserter 6 located upstream from the post-processing apparatus 3A in a direction in which the sheet P is conveyed from the image forming apparatus 2 to the post-processing apparatus 3A. Examples of the inserter 6 include, but are not limited to, an apparatus that allows a pre-printed medium, which is to be conveyed to the post-processing apparatus 3A together with the sheet P conveyed from the image forming apparatus 2, to be fed as a cover sheet, an insertion sheet, or a partition sheet without passing through the image forming apparatus 2.

Figure 19A:
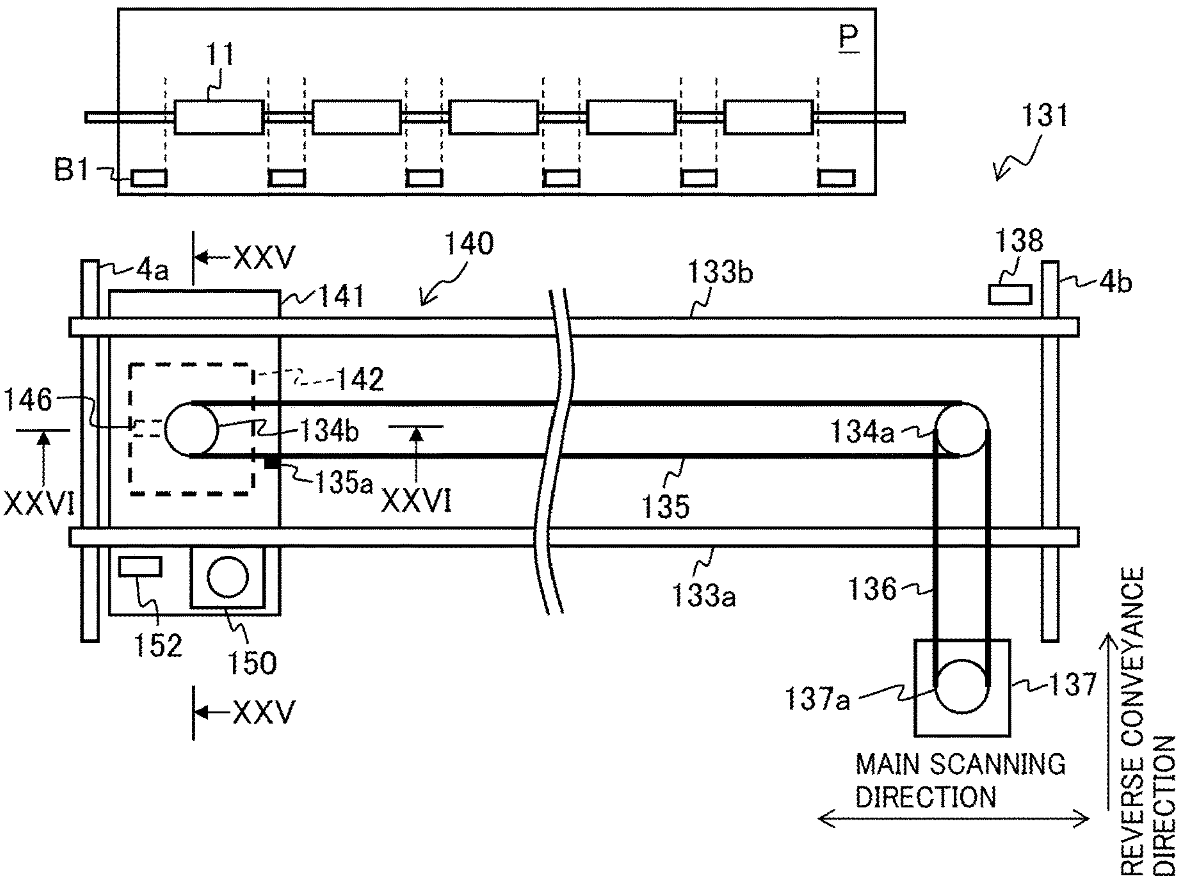
FIGS. 19A and 19B are views of a liquid applier of the post-processing apparatus of FIG. 16 in the thickness direction of the sheet.

As illustrated in FIG. 19A, the conveyance roller pair 11 is located so as not to overlap, in the main scanning direction, the liquid application position B1 on the sheet P to which the liquid has been applied by a liquid application head 146 of the liquid applier 131. This is to prevent the amount of liquid at the liquid application position B1 from decreasing due to the plurality of roller pairs pressing the liquid application position B1 when the conveyance roller pair 11 conveys the sheet P. As a result, when the sheet P reaches the crimper 32 disposed downstream from the liquid applier 31 in the opposite conveyance direction, the amount of liquid at the liquid application position B1 is sufficient to maintain the binding strength. Accordingly, the binding strength of the sheet bundle Pb is prevented from decreasing due to a decrease in the amount of liquid at the liquid application position B1 while the sheet P is conveyed.

In addition, the plurality of roller pairs of the conveyance roller pair 11 that is located so as not to overlap the liquid application position B1 on the sheet P in the main scanning direction prevents the conveying performance of the sheet P from being worse due to the adhesion of liquid to the plurality of roller pairs and further prevents a conveyance jam caused when the conveying performance of the sheet P is worsened. Although only the conveyance roller pair 11 has been described above, the plurality of roller pairs of the conveyance roller pairs 14 and 15 are preferably located so as not to overlap the liquid application position B1 on the sheet P in the main scanning direction, like the plurality of roller pairs of the conveyance roller pair 11.

The liquid applier 131 applies liquid (for example, water) to the sheet P that is conveyed by the conveyance roller pairs 10 and 11. In the following description, the application of liquid may be referred to as "liquid application." The hole punch 132 punches a hole in the sheet P that is conveyed by the conveyance roller pairs 10 and 11 such that the hole penetrates the sheet P in the thickness direction of the sheet P. The processor disposed near the liquid applier 131 is not limited to the hole punch 132. Alternatively, the processor may be an inclination corrector that corrects an inclination or skew of the sheet P that is conveyed by the conveyance roller pairs 10 and 11.

Figure 19B:
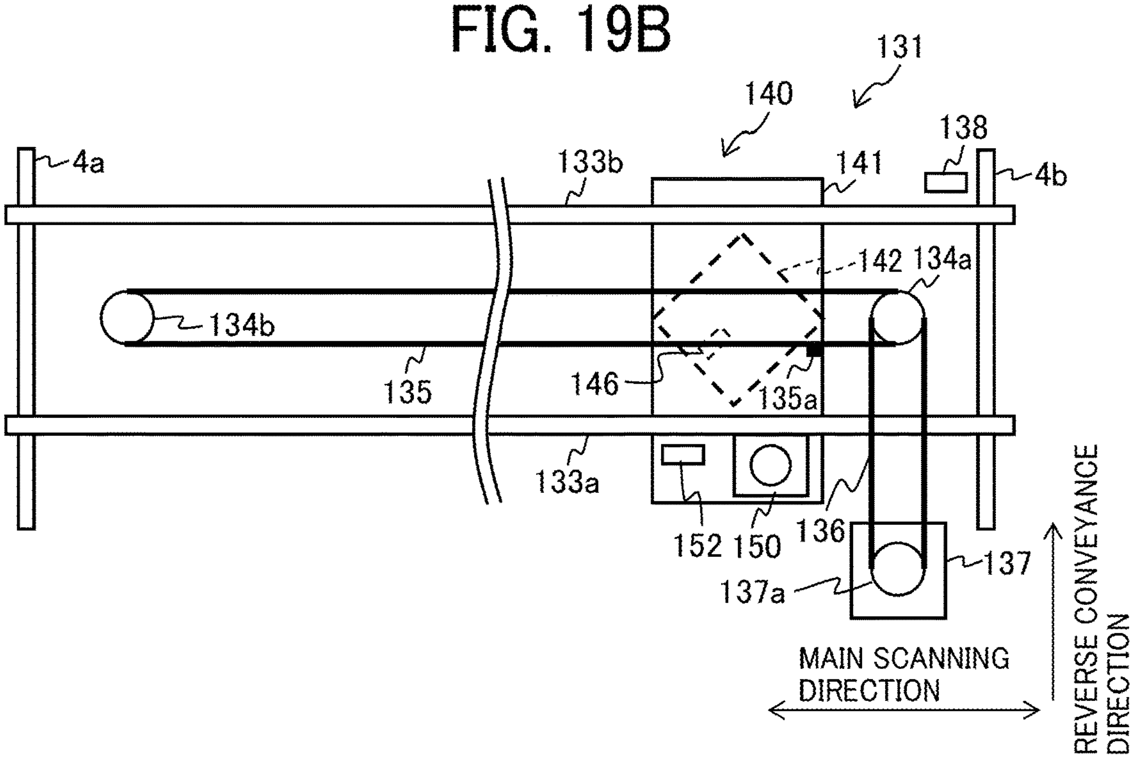
Figure 20C:
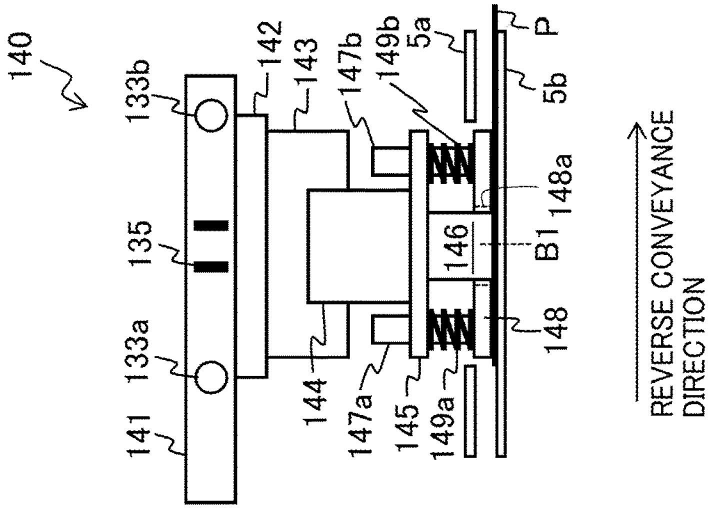
FIGS. 20A, 20B, and 20C are cross-sectional views of a liquid application unit of the liquid applier taken through XXV-XXV of FIG. 19A.
Figure 20B:
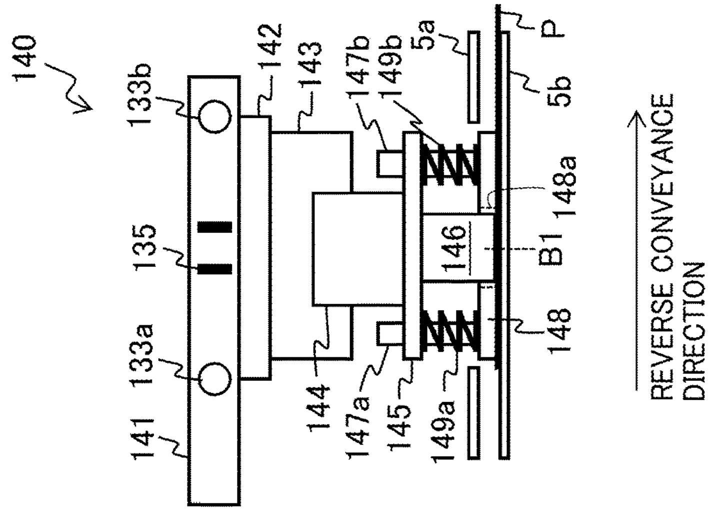
Figure 20A:
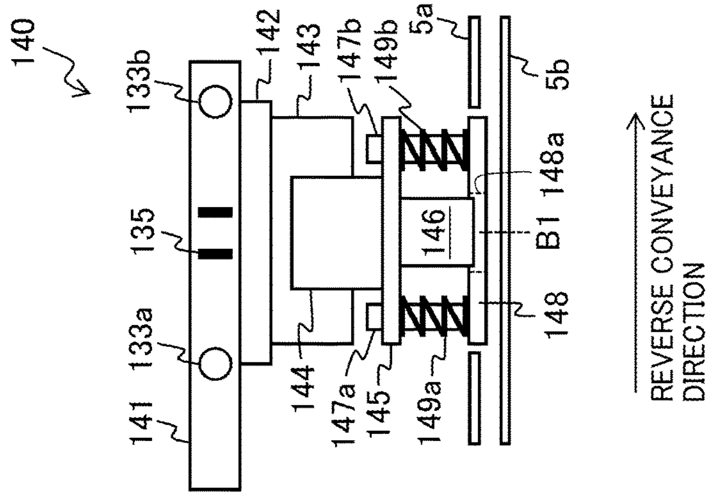

FIGS. 19A and 19B are views of the liquid applier 131 in the thickness direction of the sheet P, according to the second embodiment of the present disclosure. FIGS. 20A to 20C are cross-sectional views of a liquid application unit 140 of the liquid applier 131 taken through XXV-XXV of FIG. 19A. FIGS. 22A to 22C are cross-sectional views of the liquid application unit 140 of the liquid applier 131 taken through XXVI-XXVI of FIG. 19A. As illustrated in FIGS. 19A to 21C, the liquid applier 131 includes a pair of guide shafts 133*a* and 133*b*, a pair of pulleys 134*a* and 134*b*, endless annular belts 135 and 136, a liquid applier movement motor 137, a standby position sensor 138, and the liquid application unit 140.

The guide shafts 133*a* and 133*b*, each extending in the main scanning direction, are apart from each other in the reverse conveyance direction. The pair of guide shafts 133*a* and 133*b* is supported by a pair of side plates 4*a* and 4*b* of the post-processing apparatus 3A. On the other hand, the pair of guide shafts 133*a* and 133*b* supports the liquid application unit 140 such that the liquid application unit 140 can move in the main scanning direction.

The pair of pulleys 134*a* and 134*b* is disposed between the guide shafts 133*a* and 133*b* in the reverse conveyance direction. On the other hand, the pulleys 134*a* and 134*b* are apart from each other in the main scanning direction. The pair of pulleys 134*a* and 134*b* is supported by a frame of the post-processing apparatus 3A so as to be rotatable about an axis extending in the thickness direction of the sheet P.

The endless annular belt 135 is entrained around the pair of pulleys 134*a* and 134*b*. The endless annular belt 135 is coupled to the liquid application unit 140 by a connection 135*a*. The endless annular belt 136 is entrained around the pulley 134*a* and a driving pulley 137*a* that is fixed to an output shaft of the liquid applier movement motor 137. The liquid applier movement motor 137 generates a driving force to move the liquid application unit 140 in the main scanning direction.

As the liquid applier movement motor 137 rotates, the endless annular belt 136 circulates around the pulley 134*a* and the driving pulley 137*a* to rotate the pulley 134*a*. As the pulley 134*a* rotates, the endless annular belt 135 circulates around the pair of pulleys 134*a* and 134*b*. As a result, the liquid application unit 140 moves in the main scanning direction along the pair of guide shafts 133*a* and 133*b*. The liquid application unit 140 reciprocates in the main scanning direction in response to the rotation direction of the liquid applier movement motor 137 being switched.

The standby position sensor 138 detects that the liquid application unit 140 has reached a standby position in the main scanning direction. The standby position sensor 138 then outputs a standby position signal indicating the detection result to the controller 100, which will be described below with reference to FIG. 22. The standby position sensor 138 is, for example, an optical sensor including a light emitting unit and a light receiving unit. The liquid application unit 140 at the standby position blocks an optical path between the light emitting unit and the light receiving unit. Then, the standby position sensor 138 outputs the standby position signal in response to the light output from the light emitting unit not being received by the light receiving unit. The specific configuration of the standby position sensor 138 is not limited to the configuration described above.

As illustrated in FIGS. 20A to 20C, the conveyance passage inside the post-processing apparatus 3A is defined by an upper guide plate 5*a* and a lower guide plate 5*b*, which are apart from each other in the thickness direction of the sheet P. The liquid application unit 140 is located to face an opening of the upper guide plate 5*a*. In other words, the liquid application unit 140 faces the conveyance passage through the opening of the upper guide plate 5*a* to face the sheet P conveyed along the conveyance passage.

Figure 21A:
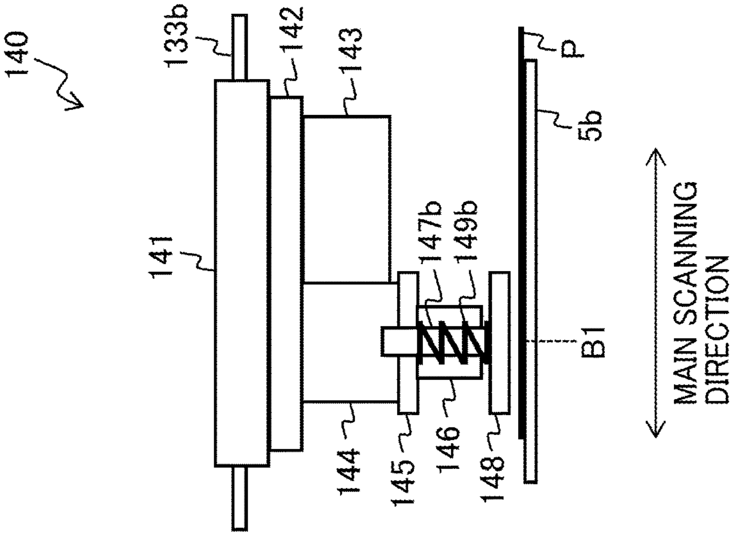
FIGS. 21A, 21B, and 21C are cross-sectional views of the liquid application unit of the liquid applier taken through XXVI-XXVI of FIG. 19A.
Figure 21B:
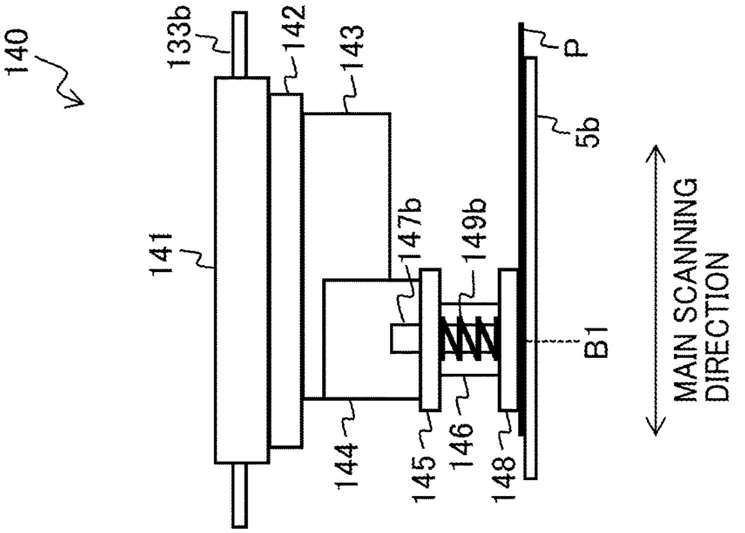
Figure 21C:
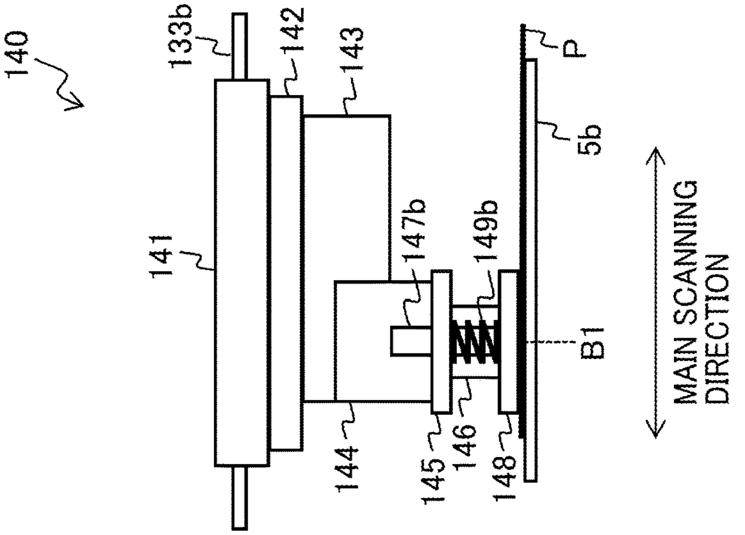
Figure 22:
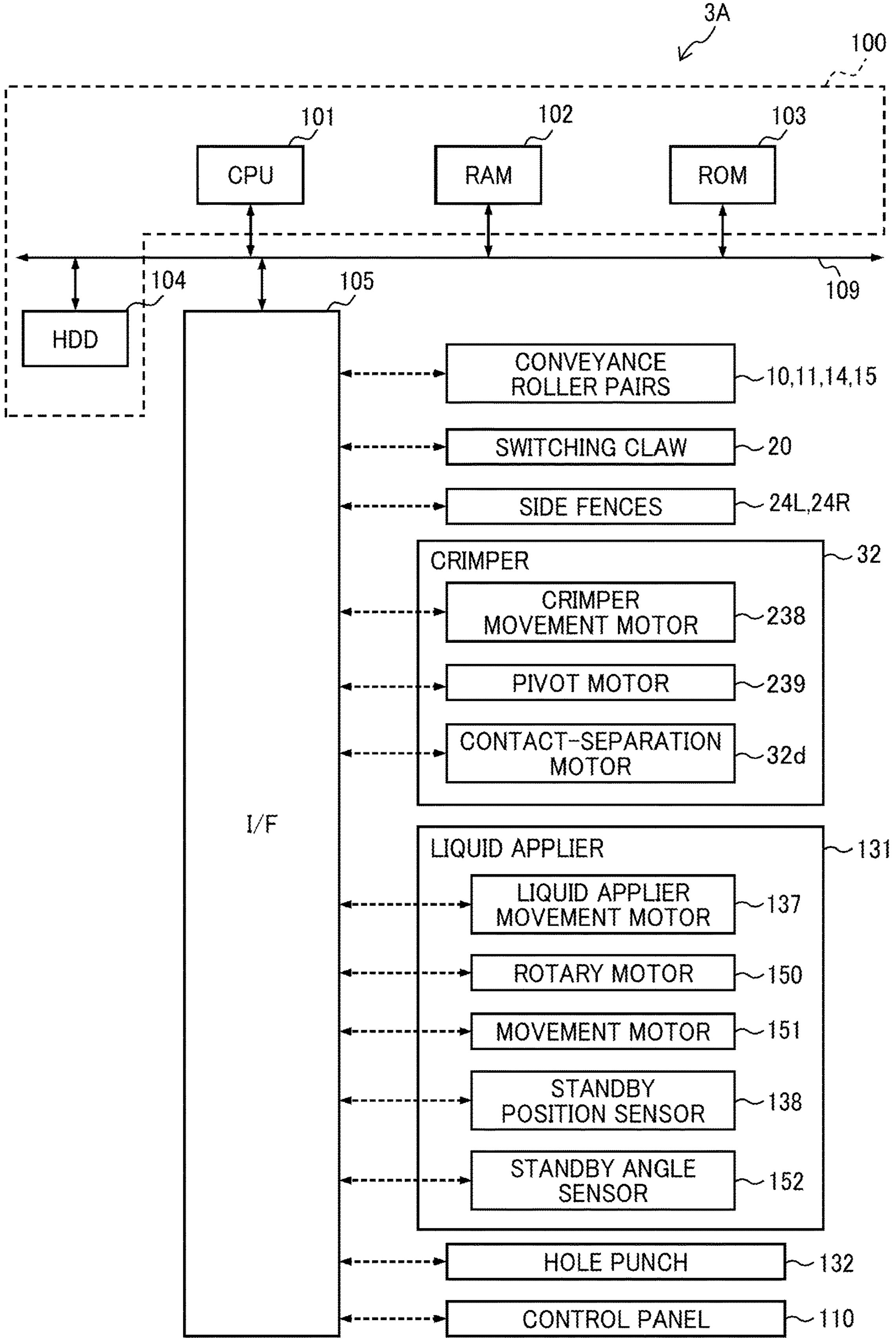
FIG. 22 is a block diagram illustrating a hardware configuration of the post-processing apparatus of FIG. 16 to control the operation of the post-processing apparatus.

As illustrated in FIGS. 19A to 21C, the liquid application unit 140 includes a base 141, a rotary bracket 142, a liquid storage tank 143, a mover 144, a holder 145, the liquid application head 146, columns 147*a* and 147*b*, a pressure plate 148, coil springs 149*a* and 149*b*, a rotary motor 150, a movement motor 151 illustrated in FIG. 22, and a standby angle sensor 152, which is also illustrated in FIG. 22.

The base 141 is supported by the pair of guide shafts 133*a* and 133*b* so as to be slidable in the main scanning direction. The base 141 is coupled to the endless annular belt 135 by the connection 135*a*. On the other hand, the base 141 supports the components of the liquid application unit 140 such as the rotary bracket 142, the liquid storage tank 143, the mover 144, the holder 145, the liquid application head 146, the columns 147*a* and 147*b*, the pressure plate 148, the coil springs 149*a* and 149*b*, the rotary motor 150, the movement motor 151, and the standby angle sensor 152.

The rotary bracket 142 is supported by a lower face of the base 141 so as to be pivotable about an axis extending in the thickness direction of the sheet P. The rotary bracket 142 is rotated with respect to the base 141 by a driving force transmitted from the rotary motor 150. On the other hand, the rotary bracket 142 supports the liquid storage tank 143, the mover 144, the holder 145, the liquid application head 146, the columns 147*a* and 147*b*, the pressure plate 148, and the coil springs 149*a* and 149*b*.

The standby angle sensor 152 detects that the rotary bracket 142 has reached a standby angle. The standby angle sensor 152 then outputs a standby angle signal indicating the detection result to the controller 100. The standby angle is, for example, an angle for the parallel binding. The standby angle sensor 152 is, for example, an optical sensor including a light emitting unit and a light receiving unit. The rotary bracket 142 at the standby angle blocks an optical path between the light emitting unit and the light receiving unit.

Then, the standby angle sensor 152 outputs the standby angle signal in response to the light output from the light emitting unit not being received by the light receiving unit. The specific configuration of the standby angle sensor 152 is not limited to the configuration described above.

Note that FIG. 19A illustrates the rotary bracket 142 in a position for the parallel binding that is performed by the crimper 32 disposed downstream from the liquid applier 131 in a direction in which the sheet P is conveyed. FIG. 19B illustrates the rotary bracket 142 in a position for the oblique binding (i.e., corner binding) that is performed by the crimper 32 disposed downstream from the liquid applier 131 in the direction in which the sheet P is conveyed.

The liquid storage tank 143 stores liquid to be applied to the sheet P. The mover 144 is supported by the liquid storage tank 143 so as to be movable (for example, up and down) in the thickness direction of the sheet P. The mover 144 is moved with respect to the liquid storage tank 143 by a driving force transmitted from the movement motor 151. The holder 145 is attached to a lower end of the mover 144. The liquid application head 146 projects from the holder 145 toward the conveyance passage (downward in the present embodiment). The liquid that is stored in the liquid storage tank 143 is supplied to the liquid application head 146. The liquid application head 146 is made of a material having a relatively high liquid absorption (for example, sponge or fiber).

The columns 147*a* and 147*b* project downward from the holder 145 around the liquid application head 146. The columns 147*a* and 147*b* can move relative to the holder 145 in the thickness direction. The columns 147*a* and 147*b* have respective lower ends holding the pressure plate 148. The pressure plate 148 has a through hole 148*a* at a position where the through hole 148*a* faces the liquid application head 146. The coil springs 149*a* and 149*b* are fitted around the columns 147*a* and 147*b*, respectively, between the holder 145 and the pressure plate 148. The coil springs 149*a* and 149*b* bias the columns 147*a* and 147*b* and the pressure plate 148 downward with respect to the holder 145.

As illustrated in FIGS. 20A and 21A, before the sheet P is conveyed to the position where the sheet P faces the opening of the upper guide plate 5*a*, the pressure plate 148 is positioned at or above the opening. Next, when the sheet P that is conveyed by the conveyance roller pairs 10 and 11 stops at a position where the liquid application position B1 on the sheet P faces the opening, the movement motor 151 is rotated in a first direction. As a result, the mover 144, the holder 145, the liquid application head 146, the columns 147*a* and 147*b*, the pressure plate 148, and the coil springs 149*a* and 149*b* are moved down together to allow the pressure plate 148 to contact the sheet P. Note that the liquid application position B1 corresponds to the crimp binding position to be crimped and bound by the edge binder 25.

As the movement motor 151 keeps rotating in the first direction after the pressure plate 148 contacts the sheet P, the coil springs 149*a* and 149*b* are compressed to further move down the mover 144, the holder 145, the liquid application head 146, and the columns 147*a* and 147*b*. As a result, as illustrated in FIGS. 20B and 21B, a lower face of the liquid application head 146 contacts the sheet P through the through hole 148*a*. Then, the liquid contained in the liquid application head 146 is applied to the sheet P.

Further rotation of the movement motor 151 in the first direction further strongly presses the liquid application head 146 against the sheet P as illustrated in FIGS. 20C and 21C. Accordingly, the amount of liquid that is applied to the sheet P increases. In short, the liquid applier 131 changes the pressing force of the liquid application head 146 against the sheet P to adjust the amount of liquid that is applied to the sheet P.

On the other hand, the rotation of the movement motor 151 in a second direction opposite to the first direction moves up the mover 144, the holder 145, the liquid application head 146, the columns 147*a* and 147*b*, the pressure plate 148, and the coil springs 149*a* and 149*b* together. As a result, as illustrated in FIGS. 20A and 21A, the liquid application head 146 and the pressure plate 148 are separated from the sheet P. In other words, the liquid applier 131 includes the liquid application head 146 that can be separated from the sheet P.

FIG. 22 is a block diagram illustrating a hardware configuration of the post-processing apparatus 3A to control the operation of the post-processing apparatus 3A according to the second embodiment of the present disclosure. As illustrated in FIG. 22, the post-processing apparatus 3A includes the CPU 101, the RAM 102, the ROM 103, the HDD 104, and the I/F 105. The CPU 101, the RAM 102, the ROM 103, the HDD 104, and the I/F 105 are connected to each other via the common bus 109.

The CPU 101 is an arithmetic unit and controls the overall operation of the post-processing apparatus 3A. The RAM 102 is a volatile storage medium that allows data to be read and written at high speed. The CPU 101 uses the RAM 102 as a working area for data processing. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3A processes, for example, a control program stored in the ROM 103 and an information processing program (application program) loaded into the RAM 102 from a storage medium such as the HDD 104. Such processing configures a software controller including various functional modules of the post-processing apparatus 3A. The software controller thus configured cooperates with hardware resources of the post-processing apparatus 3A to construct functional blocks that implement functions of the post-processing apparatus 3A. In other words, the CPU 101, the RAM 102, the ROM 103, and the HDD 104 construct the controller 100 that controls the operation of the post-processing apparatus 3A.

The I/F 105 is an interface that connects the conveyance roller pairs 10, 11, 14, and 15, the switching claw 20, the side fences 24L and 24R, the liquid applier movement motor 238, the pivot motor 239, the contact-separation motor 32*d*, the liquid applier movement motor 137, the rotary motor 150, the movement motor 151, the standby position sensor 138, the standby angle sensor 152, the hole punch 132, and the control panel 110 to the common bus 109. The controller 100 controls operations of the conveying roller pairs 10, 11, 14, and 15, the switching claw 20, the side fences 24L and 24R, the crimper movement motor 238, the pivot motor 239, the contact-separation motor 32*d*, the liquid applier movement motor 137, the rotary motor 150, the movement motor 151, and the hole punch 132 through the I/F 105. In addition, the controller 100 acquires detection results from the standby position sensor 138 and the standby angle sensor 152 through the I/F 105. Although FIG. 22 illustrates the components that execute the edge stitching process, the components that execute the saddle stitching process are also similarly controlled by the controller 100.

The control panel 110 includes an operation unit that receives instructions input by a user and a display serving as a notifier that notifies the user of information. The operation unit as an input device includes, for example, hard keys and a touch screen overlaid on a display. The control panel 110 acquires information from the user through the operation unit and provides information to the user through the display.

Figure 23:
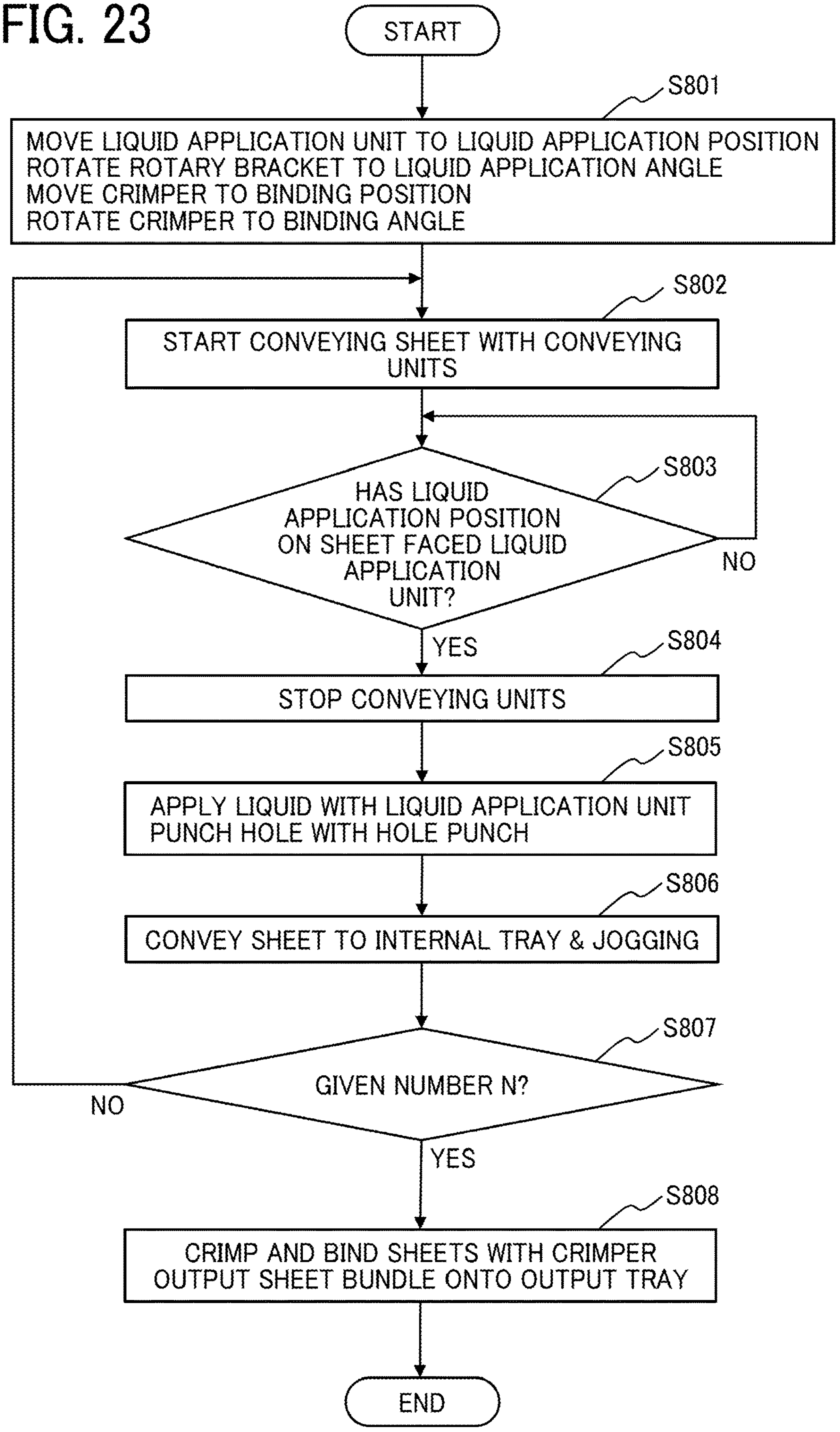
FIG. 23 is a flowchart of post-processing performed by the post-processing apparatus of FIG. 16.

FIG. 23 is a flowchart of post-processing performed by the post-processing apparatus 3A according to the second embodiment. Specifically, FIG. 23 is a flowchart of a process to execute the one-point binding illustrated in FIGS. 12A to 12D. In other words, FIG. 23 illustrates in detail a process corresponding to step S703 in the flowchart of the binding process illustrated in FIG. 11.

For example, the controller 100 executes the post-processing illustrated in FIG. 23 when the controller 100 acquires an instruction to execute the post-processing from the image forming apparatus 2. In the following description, the instruction to execute the post-processing may be referred to as a "post-processing command." The post-processing command includes, for example, the number of sheets P of the sheet bundle Pb, the crimp binding position B1 (corresponding to the liquid application position B1), a binding angle (corresponding to a liquid application angle), and an operation that is executed in parallel with the liquid application (i.e., punching a hole in the present embodiment). In the following description, the number of sheets P of the sheet bundle Pb may be referred to as a "given number N." Note that, at the start of the post-processing, the liquid application unit 140 is at the standby position HP corresponding to the standby position HP illustrated in FIGS. 12A to 12D whereas the rotary bracket 142 is held at the standby angle.

First, in step S801, the controller 100 drives the liquid applier movement motor 137 to move the liquid application unit 140 in the main scanning direction such that liquid application head 146 moves from the standby position HP to a position where the liquid application head 146 can face the liquid application position B1 corresponding to the crimp binding position B1 illustrated in FIGS. 12B and 12C. In addition, in step S801, the controller 100 drives the rotary motor 150 to rotate the rotary bracket 142 such that the liquid application head 146 rotates from the standby angle to the liquid application angle. It is ascertained based on a pulse signal output from a rotary encoder of the liquid applier movement motor 137 that the liquid application head 146 has reached the position where the liquid application head 146 can face the liquid application position B1. Similarly, it is ascertained based on a pulse signal output from a rotary encoder of the rotary motor 150 that the liquid application head 146 has reached the liquid application angle.

Further, in step S801, the controller 100 drives the crimper movement motor 238 to move the crimper 32 from the standby position HP to the position where the crimper 32 can face the crimp binding position B1 as illustrated in FIGS. 17A and 17B. Furthermore, in step S801, the controller 100 drives the pivot motor 239 to rotate the crimper 32 from the standby angle to the binding angle, which may be referred to as a crimp binding angle in the following description. It is ascertained based on a pulse signal output from a rotary encoder of the crimper movement motor 238 that the crimper 32 has reached the position where the crimper 32 can face the crimp binding position B1. Similarly, it is ascertained based on a pulse signal output from a rotary encoder of the pivot motor 239 that the crimper 32 has reached the crimp binding angle.

Subsequently, in step S802, the controller 100 drives the conveyance roller pairs 10 and 11 to start conveying the sheet P on which an image is formed by the image forming apparatus 2. In step S803, the controller 100 determines whether the liquid application position B1 on the sheet P has faced the liquid application unit 140 (more specifically, the liquid application head 146). When the liquid application position B1 on the sheet P has not faced the liquid application head 146 (NO in step S803), the controller 100 repeats the determination in step S803. In other words, the controller 100 continues driving the conveyance roller pairs 10 and 11 until the liquid application position B1 on the sheet P faces the liquid application head 146. By contrast, when the liquid application position B1 on the sheet P has faced the liquid application head 146 (YES in step S803), in step S804, the controller 100 stops the conveyance roller pairs 10 and 11. It is ascertained based on a pulse signal output from a rotary encoder of a motor that drives the conveyance roller pairs 10 and 11 that the liquid application position B1 on the sheet P has faced the liquid application head 146.

In step S805, the controller 100 executes the process of applying the liquid to the liquid application position B1 on the sheet P with the liquid applier 131 and the process of punching a hole in the sheet P with the hole punch 132 in parallel. More specifically, the controller 100 rotates the movement motor 151 in the first direction to bring the liquid application head 146 into contact with the liquid application position B1 on the sheet P. In addition, the controller 100 changes the pressing force of the liquid application head 146 (in other words, the amount of rotation of the movement motor 151) depending on the amount of liquid that is applied to the sheet P.

The amount of liquid that is applied to the sheet P may be the same for all the sheets P of the sheet bundle Pb or may be different for each sheet P. For example, the controller 100 may apply a decreased amount of liquid to the sheet P conveyed later. The amount of rotation of the movement motor 151 may be ascertained based on a pulse signal output from a rotary encoder of the movement motor 151.

In step S806, the controller 100 drives the conveyance roller pairs 10, 11, 14, and 15 to place the sheet P on the internal tray 22. The controller 100 moves the side fences 24L and 24R to align the position of the sheet bundle Pb placed on the internal tray 22 in the main scanning direction. In short, the controller 100 performs so-called jogging.

Subsequently, in step S807, the controller 100 determines whether the number of sheets P that are placed on the internal tray 22 has reached the given number N instructed by the post-processing command. When the controller 100 determines that the number of sheets P that are placed on the internal tray 22 has not reached the given number N (NO in step S807), the controller 100 executes the operations of steps S802 to S806 again.

By contrast, when the controller 100 determines that the number of sheets P that are placed on the internal tray 22 has reached the given number N of sheets (YES in step S807), in step S808, the controller 100 causes the crimper 32 to crimp and bind the crimp binding position B1 (corresponding to the liquid application position B1) on the sheet bundle Pb to which the liquid has been applied by the liquid applier 131. In addition, in step S808, the controller 100 rotates the conveyance roller pair 15 to output the sheet bundle Pb thus crimped and bound to the output tray 26. Then, the controller 100 drives the liquid applier movement motor 137 to move the liquid applier 131 to the standby position HP and drives the crimper movement motor 238 to move the crimper 32 to the standby position HP.

The processing operation when the post-processing apparatus 3A according to the second embodiment performs the one-point binding illustrated in FIGS. 12A to 12D has been described above. However, the post-processing apparatus 3A according to the second embodiment can perform the binding process in the same manner as described above by applying the binding process illustrated in the flowchart of FIG. 11 even when performing the two-point binding in the binding strength priority mode, the two-point binding in the balance mode, and the two-point binding in the producibility priority mode of FIGS. 13 to 15.

The embodiments of the present disclosure are applied to the edge binder 25 that executes the edge stitching as described above. However, the embodiments of the present disclosure may be applied to the saddle binder 28 that executes the saddle stitching.

The control method described above may be implemented by, for example, a program. That is, the control method may be executed by causing an arithmetic device, a storage device, an input device, an output device, and a control device to operate in cooperation with each other based on a program. In addition, the program may be written in, for example, a storage device or a storage medium and distributed, or may be distributed through, for example, an electric communication line.

The present disclosure is not limited to specific embodiments described above, and numerous additional modifications and variations are possible in light of the teachings within the technical scope of the appended claims. It is therefore to be understood that the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

Now, a description is given of some aspects of the present disclosure.

Initially, a description is given of a first aspect.

A medium processing apparatus includes a conveyor, a liquid applier, a crimper, a movement assembly, and a controller. The conveyor conveys a medium. The liquid applier applies liquid to a liquid application position on the medium. The crimper presses and deforms at least a portion of a plurality of media including the medium to which the liquid is applied by the liquid applier, to bind the plurality of media. The portion of the plurality of media is the liquid application position to which the liquid is applied by the liquid applier. The movement assembly moves the liquid applier in a width direction of the medium. The controller controls the conveyor, the liquid applier, the crimper, and the movement assembly. The liquid applier is movable between a standby position at which the liquid applier stands by before the liquid applier starts moving in the width direction of the medium and a position at which the liquid applier faces the liquid application position on the medium. The controller causes the movement assembly to move the liquid applier from the standby position to the position at which the liquid applier faces the liquid application position before the medium is conveyed to a position at which the liquid is applied by the liquid applier; causes the liquid applier to apply the liquid to the medium when the medium is conveyed to the position at which the liquid applier faces the liquid application position on the medium; causes the movement assembly to not move the liquid applier to the standby position until application of the liquid to the plurality of media ends; and causes the movement assembly to move the liquid applier to the standby position after the application of the liquid to the plurality of media ends.

Now, a description is given of a second aspect.

In the medium processing apparatus according to the first aspect, the controller performs a first mode in which the liquid applier applies the liquid to all of a plurality of liquid application positions on the medium or a second mode in which the liquid applier applies the liquid to a part of the plurality of liquid application positions on the medium, in a case where the crimper binds a predetermined number of media at a plurality of crimp binding positions.

Now, a description is given of a third aspect.

In the medium processing apparatus according to the first or second aspect, the controller switches between the first mode and the second mode in accordance with liquid absorbency of the medium.

Now, a description is given of a fourth aspect.

In the medium processing apparatus according to any one of the first to third aspects, the circuitry switches between the first mode and the second mode according to the predetermined number of sheets.

Now, a description is given of a fifth aspect.

The medium processing apparatus according to any one of the first to fourth aspects further includes an operation unit to allow a user to perform an input operation. The controller switches between the first mode and the second mode according to the input operation.

Now, a description is given of a sixth aspect.

In the medium processing apparatus according to any one of the first to firth aspects, the controller causes the liquid applier to apply the liquid to the medium one in every A sheets, where A is a natural number less than the predetermined number.

Now, a description is given of a seventh aspect.

In the medium processing apparatus according to any one of the second to sixth aspects, the controller determines, based on a characteristic of the medium, whether the liquid applier applies the liquid to all of the plurality of liquid application positions in a case where the crimper binds the predetermined number of media at the plurality of crimp binding positions.

Now, a description is given of an eighth aspect.

In the medium processing apparatus according to any one of the second to seventh aspects, the plurality of crimp binding positions include at least a first crimp binding position and a second crimp binding position. The controller causes the liquid applier to apply the liquid to a B-th medium of the predetermined number of media in order of the first crimp binding position and the second crimp binding position, where B is a natural number less than the predetermined number; causes the liquid applier to apply the liquid to a (B+1)-th medium of the predetermined number of media in order of the second crimp binding position and the first crimp binding position; and causes the moving assembly to move the liquid applier from one of the first crimp binding position and the second crimp binding position to the other of the first crimp binding position and the second crimp binding position by a shortest distance.

Now, a description is given of a ninth aspect.

In the medium processing apparatus according to any one of the second to eighth aspects, the plurality of crimp binding positions include at least a first crimp binding position and a second crimp binding position. The controller causes the liquid applier to apply the liquid only to the first crimp binding position of a C-th medium, where C is a natural number less than the predetermined number; causes the liquid applier to apply the liquid only to the second crimp binding position of a (C+1)-th medium; and causes the moving assembly to move the liquid applier from one of the first crimp binding position and the second crimp binding position to the other of the first crimp binding position and the second crimp binding position by a shortest distance.

Now, a description is given of a tenth aspect.

In the medium processing apparatus according to any one of the second to eighth aspects, the plurality of crimp binding positions include at least a first crimp binding position and a second crimp binding position. The controller causes the liquid applier to apply the liquid only to the first crimp binding position of each of a D-th medium and a (D+1)-th medium, where D is a natural number less than a value obtained by subtracting three from the predetermined number; causes the liquid applier to apply the liquid only to the second crimp binding position of each of a (D+2)-th medium and a (D+3)-th medium; and causes the moving assembly to move the liquid applier from one of the first crimp binding position and the second crimp binding position to the other of the first crimp binding position and the second crimp binding position by a shortest distance.

Now, a description is given of an eleventh aspect.

In the medium processing apparatus according to any one of the second to tenth aspects, the controller causes the liquid applier to apply the liquid to three or more crimp binding positions arranged along the width direction of the medium; and causes the crimper to crimp and bind the plurality of media.

Now, a description is given of a twelfth aspect.

In the medium processing apparatus according to any one of the first to eleventh aspects, the movement assembly moves the crimper together with the liquid applier.

Now, a description is given of a thirteenth aspect.

In the medium processing apparatus according to any one of the first to twelfth aspects, the liquid application position is a position corresponding to an end oblique binding position at which the crimper binds a corner of the plurality of media or a position corresponding to an end binding position at which the crimper binds a plurality of points along one side of the plurality of media.

Now, a description is given of a fourteenth aspect.

An image forming system includes: an image forming apparatus configured to form an image on the plurality of media; and the medium processing apparatus according to any one of the first to thirteenth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A medium processing apparatus, comprising:

a conveyor configured to convey a medium;

a liquid applier configured to apply liquid to a liquid application position on the medium;

a crimper configured to press and deform at least a portion of a plurality of media including the medium to which the liquid is applied by the liquid applier, to bind the plurality of media, the portion of the plurality of media being the liquid application position to which the liquid is applied by the liquid applier;

a movement assembly configured to move the liquid applier in a width direction of the medium; and circuitry configured to control the conveyor, the liquid applier, the crimper, and the movement assembly, the liquid applier being movable between a standby position at which the liquid applier stands by before the liquid applier starts moving in the width direction of the medium and a position at which the liquid applier faces the liquid application position on the medium, and the circuitry configured to:

cause the movement assembly to move the liquid applier from the standby position to the position at which the liquid applier faces the liquid application position before the medium is conveyed to a position at which the liquid is applied by the liquid applier;

cause the liquid applier to apply the liquid to the medium when the medium is conveyed to the position at which the liquid applier faces the liquid application position on the medium;

cause the movement assembly to not move the liquid applier to the standby position until application of the liquid to the plurality of media ends; and cause the movement assembly to move the liquid applier to the standby position after the application of the liquid to the plurality of media ends.

2. The medium processing apparatus according to claim 1, wherein the circuitry is configured to perform a first mode in which the liquid applier applies the liquid to all of a plurality of liquid application positions on the medium or a second mode in which the liquid applier applies the liquid to a part of the plurality of liquid application positions on the medium, in a case where the crimper binds a predetermined number of media at a plurality of crimp binding positions.

3. The medium processing apparatus according to claim 2, wherein the circuitry is configured to switch between the first mode and the second mode in accordance with liquid absorbency of the medium.

4. The medium processing apparatus according to claim 2, wherein the circuitry is configured to switch between the first mode and the second mode according to the predetermined number of sheets.

5. The medium processing apparatus according to claim 2, further comprising an operation unit to allow a user to perform an input operation, wherein the circuitry is configured to switch between the first mode and the second mode according to the input operation.

6. The medium processing apparatus according to claim 2, wherein the circuitry is configured to cause the liquid applier to apply the liquid to the medium one in every A sheets, where A is a natural number less than the predetermined number.

7. The medium processing apparatus according to claim 2, wherein the circuitry is configured to determine, based on a characteristic of the medium, whether the liquid applier applies the liquid to all of the plurality of liquid application positions in a case where the crimper binds the predetermined number of media at the plurality of crimp binding positions.

8. The medium processing apparatus according to claim 2, wherein the plurality of crimp binding positions include at least a first crimp binding position and a second crimp binding position, wherein the circuitry is configured to:

cause the liquid applier to apply the liquid to a B-th medium of the predetermined number of media in order of the first crimp binding position and the second crimp binding position, where B is a natural number less than the predetermined number;

cause the liquid applier to apply the liquid to a (B+1)-th medium of the predetermined number of media in order of the second crimp binding position and the first crimp binding position; and cause the moving assembly to move the liquid applier from one of the first crimp binding position and the second crimp binding position to the other of the first crimp binding position and the second crimp binding position by a shortest distance.

9. The medium processing apparatus according to claim 2, wherein the plurality of crimp binding positions include at least a first crimp binding position and a second crimp binding position, wherein the circuitry is configured to:

cause the liquid applier to apply the liquid only to the first crimp binding position of a C-th medium, where C is a natural number less than the predetermined number;

cause the liquid applier to apply the liquid only to the second crimp binding position of a (C+1)-th medium; and cause the moving assembly to move the liquid applier from one of the first crimp binding position and the second crimp binding position to the other of the first crimp binding position and the second crimp binding position by a shortest distance.

10. The medium processing apparatus according to claim 2, wherein the plurality of crimp binding positions include at least a first crimp binding position and a second crimp binding position, wherein the circuitry is configured to:

cause the liquid applier to apply the liquid only to the first crimp binding position of each of a D-th medium and a (D+1)-th medium, where D is a natural number less than a value obtained by subtracting three from the predetermined number;

cause the liquid applier to apply the liquid only to the second crimp binding position of each of a (D+2)-th medium and a (D+3)-th medium; and cause the moving assembly to move the liquid applier from one of the first crimp binding position and the second crimp binding position to the other of the first crimp binding position and the second crimp binding position by a shortest distance.

11. The medium processing apparatus according to claim 2, wherein the circuitry is configured to:

cause the liquid applier to apply the liquid to three or more crimp binding positions arranged along the width direction of the medium; and cause the crimper to crimp and bind the plurality of media.

12. The medium processing apparatus according to claim 1, wherein the movement assembly is configured to move the crimper together with the liquid applier.

13. The medium processing apparatus according to claim 1, wherein the liquid application position is a position corresponding to an end oblique binding position at which the crimper binds a corner of the plurality of media or a position corresponding to an end binding position at which the crimper binds a plurality of points along one side of the plurality of media.

14. An image forming system, comprising:

an image forming apparatus configured to form an image on the plurality of media; and the medium processing apparatus according to claim 1.

* * * * *